United States Patent
Pettijohn et al.

(10) Patent No.: US 9,012,564 B2
(45) Date of Patent: Apr. 21, 2015

(54) POLYETHYLENE/3-SUBSTITUTED ALKENE FILM MADE WITH ZIEGLER-NATTA OR CHROMIUM OXIDE CATALYST

(75) Inventors: Ted M Pettijohn, Magnolia, TX (US); Michael Grass, Haltern am See (DE); Stefan Buchholz, Hanau (DE); Gerhard Ellermann, Marl (DE); Anne Britt Bjaland, Porsgrunn (NO); Arild Follestad, Stathelle (NO); Jarmo Lindroos, Ulefoss (NO)

(73) Assignee: Evonik Degussa GmbH, Essen (DE)

( * ) Notice: Subject to any disclaimer, the term of this patent is extended or adjusted under 35 U.S.C. 154(b) by 24 days.

(21) Appl. No.: 13/145,043

(22) PCT Filed: Jan. 12, 2010

(86) PCT No.: PCT/EP2010/050252
§ 371 (c)(1),
(2), (4) Date: Oct. 7, 2011

(87) PCT Pub. No.: WO2010/084051
PCT Pub. Date: Jul. 29, 2010

(65) Prior Publication Data
US 2012/0022208 A1 Jan. 26, 2012

Related U.S. Application Data

(60) Provisional application No. 61/146,948, filed on Jan. 23, 2009.

(51) Int. Cl.
*C08L 23/18* (2006.01)
*B29C 49/22* (2006.01)
*C08F 210/14* (2006.01)
*C08F 210/08* (2006.01)
*C08L 23/06* (2006.01)
*C08F 210/16* (2006.01)
*C08J 5/18* (2006.01)

(52) U.S. Cl.
CPC .............. *C08F 210/16* (2013.01); *C08J 5/18* (2013.01); *C08J 2323/08* (2013.01)

(58) Field of Classification Search
None
See application file for complete search history.

(56) References Cited

U.S. PATENT DOCUMENTS

| 3,947,433 | A | 3/1976 | Witt | |
| 5,319,029 | A | 6/1994 | Martin et al. | |
| 6,740,422 | B1 * | 5/2004 | Eggers et al. | 428/474.9 |
| 7,037,563 | B2 * | 5/2006 | Oi et al. | 428/36.9 |
| 2009/0203858 | A1 | 8/2009 | Grass et al. | |

FOREIGN PATENT DOCUMENTS

| CA | 648286 | 9/1962 |
| EP | 0 533 156 | 3/1993 |
| EP | 533156 A1 * | 3/1993 |
| EP | 1 197 501 A2 | 4/2002 |
| JP | 35-6238 | 6/1960 |
| JP | 2003082028 A | 3/2003 |
| JP | 2005 53970 | 3/2005 |
| WO | 2008 006636 | 1/2008 |
| WO | 2010 084047 | 7/2010 |
| WO | 2010 084049 | 7/2010 |
| WO | 2010 084051 | 7/2010 |
| WO | 2010 084054 | 7/2010 |
| WO | 2010 136289 | 12/2010 |
| WO | 2010 136290 | 12/2010 |
| WO | 2010 136295 | 12/2010 |
| WO | 2010 136297 | 12/2010 |

OTHER PUBLICATIONS

Machine translation of JP 2005-053970 (which was provided by applicant).*
U.S. Appl. No. 13/322,527, filed Nov. 25, 2011, Kaizik, et al.
U.S. Appl. No. 13/375,091, filed Nov. 29, 2011, Winterberg, et al.
International Search Report Issued Mar. 30, 2010 in PCT/EP10/050252 filed Jan. 12, 2010.
U.S. Appl. No. 61/146,938, filed Jan. 23, 2009, Grass, et al.
U.S. Appl. No. 13/145,263, filed Jul. 19, 2011, Grass, et al.
U.S. Appl. No. 61/146,943, filed Jan. 23, 2009, Grass, et al.
U.S. Appl. No. 13/145,199, filed Jul. 19, 2011, Grass, et al.
U.S. Appl. No. 61/146,948, filed Jan. 23, 2009, Grass, et al.
U.S. Appl. No. 61/146,915, filed Jan. 23, 2009, Grass, et al.
U.S. Appl. No. 13/145,013, filed Jul. 18, 2011, Grass, et al.
Notification of Reasons for Refusal issued Oct. 21, 2013, in Japanese Patent Application No. 2011-546739, filed Jan. 12, 2010 (with English-language Translation).

* cited by examiner

*Primary Examiner* — Ling Choi
*Assistant Examiner* — Catherine S Branch
(74) *Attorney, Agent, or Firm* — Oblon, McClelland, Maier & Neustadt, L.L.P.

(57) ABSTRACT

A film containing an interpolymer of ethylene and a 3-substituted $C_{4-10}$ alkene is prepared using a catalyst system comprising a Ziegler Natta or chromium oxide catalyst.

9 Claims, No Drawings

POLYETHYLENE/3-SUBSTITUTED ALKENE FILM MADE WITH ZIEGLER-NATTA OR CHROMIUM OXIDE CATALYST

BACKGROUND OF THE INVENTION

1. Field of the Invention

The present invention relates to a film comprising an interpolymer of ethylene and 3-substituted $C_{4-10}$ alkene, wherein the interpolymer is made using a catalyst system comprising a Ziegler Natta or chromium oxide catalyst. The invention also relates to a process for the preparation of the film and to laminates and articles comprising the film.

2. Description of the Related Art

Polyethylene is widely used in the manufacture of films, often for use in packaging applications.

The use of films to form laminates for use in the packaging industry is, for instance, well known. Laminates are used to form a range of articles, for example, food containers, stand up pouches and product labels. Films used for this purpose need to possess a certain combination of properties. Specifically the films need excellent tear strength in order that during production, and in use, articles made from the film, do not fail. The films should also possess impact strength and tensile strength to make the films usable. Without adequate mechanical properties such as impact strength, thicker films have to be made which is economically unattractive and in some cases less aesthetically appealing. It is also important that films have adequate optical properties such as low haze and high gloss. Stiffness is also an important property, particularly if they are to be used in the preparation of stand up pouches. Obtaining films having a desirable combination of tear strength and stiffness is often a challenge.

Another common application of polyethylene films in the packaging industry is in the formation of bags or sacks. These are used, for example, in the packaging of food stuffs such as cereals and crisps, as well as much heavier materials such as sand, cement mix, compost, stones etc. It is often desirable for the bags to be transparent in order that their content can be easily determined. More significantly, however, and especially in the case of heavy duty sacks (e.g. bags and sacks designed for the packaging of materials up to 25 kg, or even 50 kg in weight) the key requirement is that they possess good mechanical properties such as impact strength and tensile strength, and tear strength. This is necessary as bags and sacks are usually transported on pallets, one on top of the other. Hence the total load on at least some of the sacks is extremely high, e.g. in the region of 1000 kg or more, in some instances. Moreover such sacks are rarely handled with care and must be able to withstand conventional transportation conditions without tearing. Additionally a certain level of stiffness, e.g. for stability on pallets, is usually desirable.

Films having attractive combinations of properties, especially tear strength and mechanical strength, particularly impact strength and tensile strength, as well as reasonable optical performance are therefore highly desired for use in the packaging industry. The difficulty often encountered, however, is that those polymer properties that minimize, e.g. haze, are often those that are detrimental to, e.g. impact strength. Additionally those polymers possessing low haze and reasonable impact strength, often have poor stiffness whilst those polymers possessing high tear strength often have poor stiffness and in addition tend to have high melt viscosities making melt processing difficult.

It is therefore common to utilize interpolymers and/or blends of polymers in the manufacture of films to try to provide the desired balance of film properties. Thus ethylene may be copolymerized with a comonomer such as 1-butene in order to obtain a polymer yielding films having increased dart drop strength and tear resistance. In other words comonomers are generally used to tailor the properties of a polymer to suit its target film application. There are vast numbers of commercially available films that are made from ethylene and 1-butene copolymers that provide advantages over ethylene homopolymer films.

A film manufactured from ethylene/1-butene, for example, typically has improved impact strength (e.g. dart drop) compared to an ethylene homopolymer of the same density as dart drop strength generally increases with the increasing molecular weight of the comonomer. Its optical properties are also usually excellent. On the other hand, however, films made from ethylene/1-butene copolymers often do not have as high a tear strength or as strong mechanical properties as desired. Often this is disadvantage is compensated for by making films thicker than is desirable. There is therefore a trade off between polymer properties such as impact strength, tensile strength, tear strength and melt viscosity and the thickness of the film that is usable.

DETAILED DESCRIPTION OF THE INVENTION

Based on the drawbacks of the background art, there remains a need for polymer films that are suitable for making packaging items such as laminate films and bags or sacks with an appropriate combination of mechanical properties, in particular impact strength and tensile strength, tear strength and optical properties, especially transparency and gloss. As always there is also a need for the film to be capable of being manufactured cost effectively. Since the margins on many packaging products are small, it is important that packaging costs are kept to a minimum.

It has now been surprisingly found that films comprising an interpolymer of ethylene and a 3-substituted $C_{4-10}$ alkene, wherein said interpolymer is made using a catalyst system comprising a Ziegler Natta or chromium oxide catalyst, have excellent tear strength and high tensile strength as well as reasonable impact strength and optical properties (e.g. haze). More specifically it has been unexpectedly found that such interpolymers yield films having tear strength and tensile strength that are better than those of conventional ethylene/1-butene copolymers and comparable impact strength and optical properties. In other words, the films of the present invention possess a very attractive balance of properties and may, e.g. be used at thinner gauges than conventional ethylene/1-butene films.

Films comprising an interpolymer of ethylene and a 3-substituted $C_{4-10}$ alkene have been generically disclosed in the background art but it has never been realized before that a polyethylene interpolymer with a 3-substituted $C_{4-10}$ alkene made using a catalyst system comprising a Ziegler Natta or chromium oxide catalyst would provide film with such an advantageous combination of tear strength, tensile strength, impact strength and optical properties.

In a first aspect, the present invention provides a film comprising an interpolymer of ethylene and a 3-substituted $C_{4-10}$ alkene, wherein said interpolymer is made using a catalyst system comprising a Ziegler Natta or chromium oxide catalyst.

In a preferred embodiment of the present invention, said interpolymer is made using a catalyst system comprising a Ziegler Natta catalyst.

In a further preferred embodiment of the present invention, the film is a blown film.

In a further preferred embodiment of the present invention, the film is an industrial film.

In a further aspect, the present invention provides a process for the preparation of a film as hereinbefore described comprising blowing an interpolymer of ethylene and a 3-substituted $C_{4-10}$ alkene, wherein said interpolymer is made using a catalyst system comprising a Ziegler Natta or chromium oxide catalyst.

In a still further aspect, the present invention provides a laminate comprising a film as hereinbefore described.

In yet another aspect, the present invention provides an article comprising a film as hereinbefore described (e.g. for use in packaging).

In yet another aspect, the present invention provides the use of a film as hereinbefore described in packaging.

DEFINITIONS

As used herein the term "interpolymer" refers to polymers comprising repeat units deriving from ethylene and a 3-substituted $C_{4-10}$ alkene monomer. The interpolymer may also contain repeat units deriving from other monomers, e.g. $C_{3-10}$ alkenes. Preferred interpolymers are binary (i.e. preferred interpolymers are copolymers) and comprise repeat units deriving from ethylene and one type of 3-substituted $C_{4-10}$ alkene comonomer. Other preferred interpolymers are ternary, e.g. they comprise repeat units deriving from ethylene, one type of 3-substituted $C_{4-10}$ alkene comonomer and another $C_{3-10}$ alkene. Particularly preferred interpolymers are copolymers. In preferred interpolymers at least 0.01% wt, still more preferably at least 0.1% wt, e.g. at least 0.5% wt of each monomer is present based on the total weight of the interpolymer.

The term "alkene homopolymer" as used herein refers to polymers which consist essentially of repeat units deriving from one type of $C_{2-6}$ alkene, e.g. ethylene. Homopolymers may, for example, comprise at least 99.9% wt e.g. at least 99.99% wt of repeat units deriving from one type of $C_{2-6}$ alkene based on the total weight of the polymer.

As used herein, the term 3-substituted $C_{4-10}$ alkene refers to an alkene having: (i) a backbone containing 4 to 10 carbon atoms, wherein the backbone is the longest carbon chain in the molecule that contains an alkene double bond, and (ii) a substituent (i.e. a group other than H) at the 3 position.

As used herein the term catalyst system refers to the total active entity that catalyses the polymerization reaction. Typically the catalyst system is a coordination catalyst system comprising a transition metal compound (the active site precursor) and an activator (sometimes referred to as a cocatalyst) that is able to activate the transition metal compound. The catalyst system of the present invention preferably comprises an activator, at least one transition metal active site precursor and a particle building material that may be the activator or another material. Preferably, the particle building material is a carrier.

As used herein the term "multisite catalyst system" refers to a catalyst system comprising at least two different active sites deriving from at least two chemically different active site precursors. A multisite catalyst system used in the present invention comprises at least one Ziegler Natta or chromium oxide catalyst. Examples of a multisite catalyst system are one comprising two or three different Ziegler Natta active sites precursors or one comprising a Ziegler Natta active site and a metallocene active site. If there are only two active sites in the catalyst system, it can be called a dual site catalyst system. Particulate multisite catalyst systems may contain its different active sites in a single type of catalyst particle. Alternatively, each type of active site may each be contained in separate particles. If all the active sites of one type are contained in separate particles of one type, each type of particles may enter the reactor through its own inlet.

As used herein the term Ziegler Natta (ZN) catalyst refers to a catalyst that preferably comprises a transition metal component (e.g. Ti) which is sigma bonded to its ligands and an activator (e.g. an Al containing organometallic compound). Preferred Ziegler Natta catalysts additionally comprise a particle building material.

As used herein the term particulate catalyst system means a catalyst system that when fed to the polymerization reactor or into the polymerization section, has its active sites or active site(s) precursors within solid particles, preferably porous particles. This is in contrast to catalyst systems with active sites, or precursor compounds, which are liquid or are dissolved in a liquid. It is generally presumed that when carrying out a polymerization using a particulate catalyst system the particles of the catalyst will be broken down to catalyst fragments. These fragments are thereafter present within polymer particles whenever the polymerization is carried out in conditions whereby solid polymer forms. The particulate catalyst system may be prepolymerized during the catalyst preparation production process or later. The term particulate catalyst system also includes the situation wherein an active site or active site precursor compound contacts a carrier just before, or at the same time, as the active site or active site precursor compound contacts the monomer in the polymerization reactor.

As used herein the term "slurry polymerization" refers to a polymerization wherein the polymer forms as a solid in a liquid. The liquid may be a monomer of the polymer. In the latter case the polymerization is sometimes referred to as a bulk polymerization. The term slurry polymerization encompasses what is sometimes referred to in the art as supercritical polymerization, i.e. a polymerization wherein the polymer is a solid suspended in a fluid that is relatively close to its critical point, or if the fluid is a mixture, its pseudocritical point. A fluid may be considered relatively close to its critical point if its compressibility factor is less than double its critical compressibility factor or, in the case of a mixture, its pseudocritical compressibility factor.

Gas phase polymerization is a term of the art and is readily understood by the skilled man.

As used herein the term "solution polymerization" refers to a polymerization wherein, in the polymerization reactor, the polymers are dissolved in a solvent.

As used herein the term "polymerization section" refers to all of the polymerization reactors present in a multistage polymerization. The term also encompasses any prepolymerization reactors that are used.

As used herein the term "multimodal" refers to a polymer comprising at least two components, which have been produced under different polymerization conditions and/or by using a multisite catalyst system in a single reactor and/or by using two or more different catalyst systems in a polymerization stage resulting in different (weight average) molecular weights and molecular weight distributions for the components. The prefix "multi" refers to the number of different components present in the polymer. Thus, for example, a polymer consisting of two components only is called "bimodal". The form of the molecular weight distribution curve, i.e. the appearance of the graph of the polymer weight fraction as a function of its molecular weight, of a multimodal polyalkene will show two or more maxima or at least be distinctly broadened in comparison with the curves for the individual components. In addition, multimodality may show as a difference in melting or crystallization temperature of components.

In contrast a polymer comprising one component produced under constant polymerization conditions is referred to herein as unimodal.

As used herein the term laminate refers to a film structure comprising at least one film layer and a substrate. The film structure is prepared by adhering said film layer(s) to said substrate. During the adhesion process, the film layer(s) and the substrate are solid (i.e. they do not form a melt or liquid during the adhesion process).

As used herein the term lamination film refers to the film layer(s) that are used in the lamination process. The lamination film may comprise 1 or more (e.g. 3, 5, 7) layers.

As used herein the term substrate refers to the material to which at least one lamination film is adhered. It may, for example, comprise a polymer, a metal or paper. If the substrate is polymeric, it preferably has a higher melting/softening point than the lamination film.

Ethylene

Ethylene for use in preparation of films of the invention is commercially available from numerous suppliers, e.g. from Sigma Aldrich.

3-Substituted $C_{4-10}$ alkene

Preferably, the substituent present at carbon 3 of the 3-substituted $C_{4-10}$ alkene is a $C_{1-6}$ alkyl group. The alkyl group may be substituted by non-hydrocarbyl substituents or unsubstituted. Representative examples of non-hydrocarbyl substituents that may be present on the alkyl group include F and Cl. Preferably, however, the $C_{1-6}$ alkyl group is unsubstituted. Particularly preferably the substituent group present at carbon 3 is a $C_{1-3}$ alkyl group such as methyl, ethyl or iso-propyl. Methyl is an especially preferred substituent group.

Preferably, the 3-substituted $C_{4-10}$ alkene is solely substituted at carbon 3. If, however, a substituent is present at another position it is preferably a $C_{1-6}$ alkyl group as described above for the substituent present at carbon 3.

The 3-substituted $C_{4-10}$ alkene is preferably a monoalkene. Still more preferably the 3-substituted $C_{4-10}$ alkene is a terminal alkene. In other words, the 3-substituted $C_{4-10}$ alkene is preferably unsaturated at carbon numbers 1 and 2. Preferred 3-substituted $C_{4-10}$ alkenes are thus 3-substituted $C_{4-10}$ alk-1-enes.

Preferred 3-substituted $C_{4-10}$ alkenes for use in the interpolymers are those of formula (I):

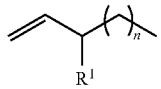

wherein $R^1$ is a substituted or unsubstituted, preferably unsubstituted, $C_{1-6}$ alkyl group and n is an integer between 0 and 6.

In preferred compounds of formula (I) R' is methyl or ethyl, e.g. methyl. In further preferred compounds of formula (I) n is 0, 1 or 2, still more preferably 0 or 1, e.g. 0.

Representative examples of compounds of formula (I) that can be used in the interpolymers include 3-methyl-1-butene, 3-methyl-1-pentene, 3-methyl-1-hexene, 3-ethyl-1-pentene and 3-ethyl-1-hexene. A particularly preferred 3-substituted $C_{4-10}$ alkene is 3-methyl-1-butene.

3-substituted $C_{4-10}$ alkenes for use in the invention are commercially available, e.g. from Sigma-Aldrich. 3-methyl-1-butene can be made, e.g. according to WO 2008/006633.

Other $C_{3-8}$ Alkene

The interpolymer may comprise one or more additional $C_{3-8}$ alkene. Preferably, the amount of additional $C_{3-8}$ alkene present in the interpolymer is 0.01-15% wt, more preferably 0.1-10% wt, e.g. 1-5% wt.

Preferably, the additional $C_{3-8}$ alkene is a monoalkene. Still more preferably the $C_{3-8}$ alkene is a terminal alkene. In other words, the $C_{3-8}$ alkene is preferably unsaturated at carbon numbers 1 and 2. Preferred $C_{3-8}$ alkenes are thus $C_{3-8}$ alk-1-enes.

The $C_{3-8}$ alkene is preferably a linear alkene. Still more preferably the $C_{3-8}$ alkene is an unsubstituted $C_{3-8}$ alkene.

Representative examples of $C_{3-8}$ alkenes that may be present in the interpolymer include propylene, 1-butene, 1-pentene, 4-methyl-1-pentene, 1-hexene and 1-octene. Preferably, the $C_{3-8}$ alkene is selected from propylene, 1-butene, 4-methyl-1-pentene or mixtures therefore.

$C_{3-8}$ alkenes for use in the present invention are commercially available. Alternatively, propylene and but-1-ene may be prepared by thermal cracking. Linear olefins are available from catalytic oligomerization of ethylene or by Fischer Tropsch synthesis.

Preferably, the interpolymer does not comprise an alkene other than ethylene or 3-substituted $C_{4-10}$ alkene.

Catalyst System

The polymerization catalyst system used in the preparation of the interpolymer comprises a Ziegler Natta or chromium oxide catalyst, preferably a Ziegler Natta catalyst.

Catalyst systems comprising a Ziegler Natta catalyst may be used in solution form or particulate form but is preferably in particulate form. Catalyst systems comprising a chromium oxide catalyst are in the form of particulates.

The particles preferably have a weight average particle size of 0.5 to 250 microns, preferably 4 to 150 microns.

Ziegler Natta Catalyst System

The Ziegler Natta catalyst system preferably comprises a transition metal component and an activator. Preferably, the transition metal component, when added to the polymerization reaction is contained within solid particles. Still more preferably at least some activator (sometimes referred to as a cocatalyst) is added to the polymerization as a liquid or solution.

Catalyst System Particles

Transition Metal Component

The active site of the catalyst system is a transition metal. Group 4 or 5 transition metals are preferred, particularly Group 4 metals, and especially Ti. In particularly preferred Ziegler Natta catalysts only Group 4 transition metals (e.g. Ti) are present.

During preparation of the catalyst system it is preferred to use transition metals in the form of alkoxy or halide compounds, especially chlorides. Particularly preferably Ti, at the stage of its introduction into the catalyst system preparation process, is provided as $TiCl_4$.

The content of transition metal in the final solid catalyst based on the weight of dry, solid, catalyst component is preferably 0.1-5 mmol/g.

Preferably, the final solid catalyst system particles also comprise a group metal, preferably a magnesium compound, still more preferably a Mg—Cl compound, e.g. $MgCl_2$.

The magnesium compound may be introduced into the catalyst system preparation as the Mg—Cl (e.g. $MgCl_2$ compound itself), but it is preferred to make it in situ within the catalyst system preparation procedure to endure a high degree of dispersion, contact with the transition metal and porosity. The skilled man is aware of how to carry out such an in situ reaction.

The content of Mg in the final solid catalyst based on the weight of dry, solid, catalyst component is preferably 1-25 wt %.

Particle Building Material

The particle building material present in the Ziegler Natta catalyst system may be an inorganic oxide support such as silica, alumina, titania, silica-alumina and silica-titania or may be Mg or Ca compounds such as chlorides, oxychlorides, alkyls or alkoxides or metal salts with organic anions. Preferably, however, the material is silica or $MgCl_2$ with optional other components.

The particle building material preferably comprises 30-90 wt % of the final, dry solid catalyst. If the particle building material comprises Mg—Cl compounds, then typically the building material will also function as the magnesium compound hereinbefore described. If the particle building material is a metal oxide, the metal oxide particles typically define the final catalyst system outer morphology and the other components of the catalyst system will be synthesized inside its pores.

Preformed carriers that are suitable for the preparation of Ziegler Natta catalyst systems are commercially available, e.g. from Grace and PQ Corporation. A preferred preformed carrier material for use in the catalyst system is inorganic material, e.g. an oxide of silicon and/or of aluminium or $MgCl_2$. Preferably, the carrier is an oxide of silicon and/or aluminium. Still more preferably the carrier is silica.

Preferably, the carrier particles have an average particle size of 1 to 500 microns, preferably 3 to 250 microns, e.g. 10 to 150 microns. Particles of appropriate size can be obtained by sieving to eliminate oversized particles. Sieving can be carried out before, during or after the preparation of the catalyst system. Preferably, the particles are spherical. The surface area of the carrier is preferably in the range 5 to 1200 $m^2/g$, more preferably 50 to 600 $m^2/g$. The pore volume of the carrier is preferably in the range 0.1 to 5 $cm^3/g$, preferably 0.5-3.5 $cm^3/g$.

If a metal oxide is the carrier, preferably the carrier is dehydrated prior to use. Particularly preferably the carrier is heated at 100 to 800° C., more preferably 150 to 700° C., e.g. at about 250° C. prior to use. Preferably, dehydration is carried out for 0.5-12 hours.

If the catalyst is to be used for solution polymerization, preferably no carrier is used. For solution polymerization, it is preferred that the majority (e.g. all) of the particle building material is identical to the group 2 compound associated with the transition metal.

Activator and Additional Components

The activator is a compound that is capable of activating the transition metal component. It is sometimes referred to as a cocatalyst. Useful activators are, amongst others, aluminium alkyls and aluminium alkoxy compounds. Especially preferred activators are aluminium alkyls, in particular, aluminium trialkyls (e.g. trimethyl aluminium, triethyl aluminium and tri-isobutyl aluminium). The activator is preferably used in excess to the transition metal component. For instance, when an aluminium alkyl is used as an activator, the molar ratio of the aluminium in the activator to the transition metal in the transition metal component is from 1 to 500 mol/mol, preferably 2 to 100 mol/mol, e.g. 5 to 50 mol/mol. The activator is typically not a part of the solid, particulate catalyst, but added to the polymerization reactor as a liquid.

The Ziegler Natta catalyst system may additionally comprise co-activators and/or modifiers. Thus, for example, two or more alkyl aluminium compounds as described above may be used and/or the catalyst components may be combined with different types of ethers, esters, silicon ethers etc to modify the activity and/or selectivity of the catalyst system as is known in the art.

Catalyst System Preparation

The Ziegler Natta catalyst system may be prepared by procedures known in the art, e.g. as disclosed in U.S. Pat. No. 5,332,793, U.S. Pat. No. 6,187,866, U.S. Pat. No. 5,290,745, U.S. Pat. No. 3,901,863, U.S. Pat. No. 4,294,2200, U.S. Pat. No. 4,617,360, WO 91/18934.

The solid catalyst system particles may optionally be washed prior to use to remove non bonded transition metal. In the final catalyst system particle added to the polymerization, only very minor amounts of transition metal should be extractable in alkanes at 80° C.

The average particle size of the catalyst system particles is preferably in the range 1 to 250 µm, more preferably 4 to 100 µm, still more preferably 6 to 30 µm, e.g. 10 to 25 µm for slurry and gas phase polymerization and 2 to 20 µm for solution phase polymerization. In all cases, the particles are preferably spherical.

The surface area of the catalyst system particles is preferably in the range 1-500 $m^2/g$, more preferably 2-300 $m^2/g$. The pore volume of the catalyst system particles is preferably in the range 0.1-5 $cm^3/g$, preferably 0.2-1.5 $cm^3/g$.

Chromium Oxide Catalyst Systems

Procedures for making chromium oxide catalyst systems are well known in the art. Chromium oxide catalysts, also called Phillips catalysts, are typically made by calcining a porous powder of silica, silica-alumina or aluminium phosphate together with a Cr compound that is not heat stable, in a flow of dry, oxygen-containing gas at a temperature of 500-900° C. The Cr content is preferably 0.1-2% wt. They are preferably used without cocatalysts or activators, but sometimes minor amounts of Al or B alkyls are added to the polymerization reactor. The molecular weight of the polymer to be produced may be highly influenced by the temperature chosen for the calcination. Generally the higher the calcination temperature used, the lower the molecular weight of the resulting polymer.

Multisite Catalyst Systems

Multisite catalyst systems may be used in the preparation of interpolymers present in the films of the present in the films of the invention.

Multisite catalyst systems for use in the polymerization may be hybrids from two (or more) different catalyst families but must include at least one Ziegler Natta or chromium oxide active site. For instance, Ziegler Natta and single site catalytic sites may be used together, e.g. by impregnating metallocene site precursor and activator for the metallocene into the pores of a particulate Ziegler Natta catalyst. Alternatively, chromium oxide may be used together with a metallocene, e.g. by impregnating, under inert conditions, metallocene site precursor and activator for the metallocene into the pores of a particulate, thermally activated chromium oxide catalyst. Ziegler Natta and chromium oxide catalysts may also be used, e.g. as a system where the solid component of each of these catalysts are fed as separate particles to the polymerization reactor, and a relatively minor amount of the cocatalyst needed for the Ziegler Natta component is used. Alternatively, multisite catalyst systems comprising two different ZN sites, e.g. both Hf and Ti active sites, may be prepared.

Alternatively, chromium oxide catalysts may, in some cases, behave as dual site catalysts, e.g. if they are supported on aluminum phosphate (with a surplus of Al vs. P). This is believed to be due to the effect of the support influencing the properties of the active site.

High Catalyst Activity/Productivity

A feature of the above-described catalyst system, particularly in gas and slurry phase polymerization, is that it has a high activity coefficient in the copolymerization of ethylene and 3-substituted $C_{4-10}$ alkene at a polymerization temperature of about 80° C. Preferably, the activity coefficient of the catalyst system is at least 60 g polyalkene/(g cat. system, h, bar), still more preferably the activity coefficient of the catalyst system is at least 80 g polyalkene/(g cat. system, h, bar), e.g. at least 110 g polyalkene/(g cat. system, h, bar). There is no upper limit on the activity coefficient, e.g. it may be as high as 1000 g polyalkene/(g cat. system, h, bar).

The high catalytic productivity has many advantages. For instance, it decreases the production cost of the polymer and minimizes any safety risks associated with the handling of catalytic materials as less are required. Additionally the ability to use a lesser amount of catalyst system per kg of final polymer in some cases enables production plants to increase their production output without having to increase their reactor size or catalyst materials feed systems.

Even more significantly, however, the fact that a lesser amount of catalyst system can be used per kg of final polymer means that less catalyst and/or catalyst system residues are present in the polymer as impurities and films made therefrom are much less prone to degradation. This can be achieved without washing (e.g. deashing) the polymer as described below.

Polymerization and Downstream Process

The interpolymer present in the films of the present invention may be prepared by any conventional polymerization process, e.g. gas phase polymerization and/or slurry polymerization and/or solution polymerization. Preferably, the interpolymer is made using slurry and/or gas phase polymerization, e.g. slurry polymerization.

A prepolymerization may also be employed as is well known in the art. In a typical prepolymerization less than about 5% wt of the total polymer is produced. A prepolymerization does not count as a stage with regard to consideration of whether a process is a single or multistage process.

Gas Phase Polymerization

Commercial Processes

The gas phase polymerization is preferably carried out in a conventional gas phase reactor such as a bed fluidized by gas feed or in a mechanically agitated bed, or in a circulating bed process. Suitable gas phase processes for polyethylene are, for example, Unipol PE gas feed fluidized single reactor process and Unipol PE II gas feed fluidized staged reactor process by Univation, Evolue gas feed fluidized staged reactor process by Mitsui, Innovene gas feed fluidized single reactor process by Ineos, Lupotech G gas fed fluidized single reactor process and Spherilene gas feed fluidized staged reactor process by LyondellBasell, and last polymerization part of Borstar PE staged reactor process by Borealis.

Gas Phase Reactor Parameters and Operation

The high activity of the polymerization catalyst system with 3-substituted $C_{4-10}$ alkene comonomer allow for efficient gas phase polymerization to be carried out. Preferably, the productivity of the solid catalyst is at least 2500 g polymer per g of solid catalyst system. Still more preferably the productivity of the solid catalyst is at least 3500 g polymer/g catalyst system, e.g. at least 5000 g polymer/g solid catalyst system. The upper limit is not critical but might be in the order of 100 000 g polymer/g solid catalyst system. Preferably, the productivity of the total catalyst system is at least 1000 g polymer per g of total catalyst system. Still more preferably the productivity of the solid catalyst is at least 1500 g polymer/g total catalyst system, e.g. at least 2000 g polymer/g total catalyst system. The upper limit is not critical but might be in the order of 20000 g polymer/g total catalyst system.

Advantageously, the process typically proceeds without reactor fouling.

The conditions for carrying out gas phase polymerization are well established in the art. The reaction temperature is preferably in the range 30 to 120° C., e.g. 50 to 100° C. The total gauge pressure is preferably in the range 1 to 100 bar, e.g. 10 to 40 bar. The total monomer partial pressure is preferably in the range 2 to 20 bar, e.g. 3 to 10 bar. The residence time in each gas phase reactor is preferably in the range 0.3 to 7 hours, more preferably 0.5 to 4 hours, still more preferably 0.7 to 3 hours, e.g. 0.9 to 2 hours.

Hydrogen is also preferably fed into the reactor to function as a molecular weight regulator. The molar ratio between the concentration of hydrogen and the feed of ethylene into the reactor system is preferably 1:1000-1:1.

The concentration in the gas in the reactor of the major monomer, ethylene, is preferably 10-70 mol %, more preferably 20-50 mol %, while the 3-substituted $C_{4-10}$ alkene comonomer concentration preferably is 1-70 mol %, more preferably 5-50 mol %.

Preferably, nitrogen is also present in the reactor. It functions, e.g. as a flushing gas.

Preferably, a $C_{3-8}$ saturated hydrocarbon is also fed into the reactor. Particularly preferably a $C_{3-6}$ alkane (e.g. propane, n-butane) is fed into the reactor. It functions to increase heat transfer efficiency, thereby removing heat more efficiently from within the reactor.

Preferably, the gas phase polymerization reaction is carried out as a continuous or semi-continuous process. Thus the monomers, hydrogen and other optional gases are preferably fed continuously or semi-continuously into the reactor. Preferably, the catalyst system is also fed continuously or semi-continuously into the reactor. Still more preferably polymer is continuously or semi-continuously removed from the reactor. By semi-continuously is meant that addition and/or removal is controlled so they occur at relatively short time intervals compared to the polymer residence time in the reactor, e.g. between 20 seconds to 2 minutes, for at least 75% (e.g. 100%) of the duration of the polymerization.

Thus in a preferred process the catalyst components or catalyst system is injected into the reactor at a rate equal to its rate of removal from the reactor. An advantage of the process herein described, however, is that because less catalyst system can be used per kg of polymer produced, less catalyst system is removed from the reactor along with polymer. The interpolymers obtained directly from the polymerization reactor(s) therefore comprise less impurities deriving from the catalyst system.

When used in a gas phase polymerization of a 3-substituted $C_{4-10}$ alkene comonomer, the polymerization catalyst system herein described gives a very high activity, enabling a high productivity (g polymer/g catalyst system). Consequently relatively low concentrations of catalyst system are required in the reactor. Preferably, the concentration of the total catalyst system in the gas phase polymerization is less than 1 kg/ton polymer, still more preferably less than 0.8 kg/ton polymer, e.g. less than 0.5 kg/ton polymer.

As mentioned above, the gas phase polymerization reaction preferably comprises a $C_{3-8}$ saturated hydrocarbon such as a $C_{3-6}$ alkane. The function of the $C_{3-8}$ saturated hydrocarbon is to increase the heat removal efficiency in the gas phase reactor. Cooling of particles is achieved by circulating the $C_{3-8}$ saturated hydrocarbon within the reactor through the polymerization zone where it picks up heat from the particles, to a cooling surface, where it is cooled, and then recycled.

This process is important, since if any particle overheats sufficiently, it will melt and stick together with another particle or with the reactor wall, i.e. agglomerate. $C_3$-$C_6$ hydrocarbons have higher specific heat capacity than nitrogen and have been found to function more efficiently for heat removal than e.g. nitrogen.

Thus in a typical gas phase polymerization, in addition to the monomers, there is usually added a substantial concentration of $C_{3-8}$ saturated hydrocarbon, e.g. $C_{3-6}$ alkane. For instance, the concentration of $C_{3-8}$ saturated hydrocarbon in the reactor may be in the order of 5-60 mol %.

It has now been found, however, that 3-substituted $C_{4-10}$ alkenes such as 3-methyl-but-1-ene can act as an effective in situ means for removing heat. It is possible, and in many cases preferable, to utilize a relatively high partial pressure of 3-substituted $C_{4-10}$ alkene in gas phase polymerization and it has been found that it serves as a means to remove heat from the reactor. This is a further advantage of using a 3-substituted $C_{4-10}$ alkene comonomer instead of e.g. a linear 1-butene or 1-hexene. In this way, the cooling can be improved and the amount of $C_{3-8}$ saturated hydrocarbon, e.g. $C_3$-$C_6$ alkane, can be reduced. The advantage of eliminating addition of $C_{3-8}$ saturated hydrocarbon, e.g. $C_{3-6}$ alkane, is that this gas must be acquired, purified, added, controlled, removed from the reactor and the polymer and separated from the gas mixture, especially in quantities.

An advantage of the above-described gas phase polymerization is therefore that it can be carried out with no additional $C_{3-8}$ saturated hydrocarbon or with less additional $C_{3-8}$ saturated hydrocarbon. In preferred gas phase polymerizations the concentration of $C_{3-8}$ saturated hydrocarbon, e.g. $C_{3-6}$ alkane, is therefore less than 20% mol, more preferably less than 10% mol, still more preferably less than 5% mol. In some cases substantially no $C_{3-8}$ saturated hydrocarbon, e.g. $C_{3-6}$ alkane may be present.

In a further preferred gas phase polymerization the molar ratio of $C_{3-8}$ saturated hydrocarbon, e.g. $C_{3-6}$ alkane, to 3-substituted $C_{4-10}$ alkene is less than 2:1, preferably less than 1:1, more preferably less than 1:2, e.g. less than 1:9.

The partial pressure of 3-substituted $C_{4-10}$ alkene present in the gas phase reactor is preferably at least 10% of the total pressure, more preferably at least 20% of the total pressure, e.g. at least 40% of the total pressure.

For instance, a gas phase polymerization may be carried out under the following conditions:
  a concentration of $C_{3-6}$ alkane of 0.01-5 mol %
  a concentration of nitrogen, 10-40 mol %,
  a concentration of ethylene of 10-50 mol %,
  a partial pressure of 3-substituted $C_{4-10}$ alkene (e.g. 3-methyl but-1-ene) of more than 20% of the total pressure in the reactor, and
  a concentration of hydrogen of 1-5 mol %.

Preferably, the feed of $C_{3-6}$ alkane into the gas phase reactor system (reactor+recirculation system) is less than 100 kg/ton polyethylene, preferably less than 30 kg/ton polyethylene, more preferably less than 10 kg/ton polyethylene.

Slurry Phase Polymerization

The slurry polymerization reaction is preferably carried out in conventional circulating loop or stirred tank reactors. Suitable polyalkene processes are, for example, Hostalen staged (where catalyst system and polymer sequentially pass from reactor to reactor) tank slurry reactor process for polyethylene by LyondellBasell, LyondellBasell-Maruzen staged tank slurry reactor process for polyethylene, Mitsui staged tank slurry reactor process for polyethylene by Mitsui, CPC single loop slurry polyethylene process by Chevron Phillips, Innovene staged loop slurry process by Ineos and in part the Borstar staged slurry loop and gas phase reactor process for polyethylene by Borealis.

The high activity of the catalyst systems hereinbefore described allow for efficient slurry polymerization to be carried out. Preferably, the productivity achieved based on the total (dry) weight of the catalyst system in the polymerization process is at least 1 ton polymer/kg of catalyst system. Still more preferably the productivity of the total catalyst system is at least 2 ton polymer/kg catalyst system, e.g. at least 3 ton polymer/kg catalyst system. The upper limit is not critical but might be in the order of 30 ton polymer/kg catalyst system. Advantageously, the process typically proceeds without reactor fouling.

Slurry Reactor Parameters and Operation

The conditions for carrying out slurry polymerizations are well established in the art. The reaction temperature is preferably in the range 30 to 120° C., e.g. 50 to 100° C. The reaction pressure will preferably be in the range 1 to 100 bar, e.g. 10 to 70 bar. The residence time in the reactor or reactors (i.e. in the polymerization section) is preferably in the range 0.5 to 6 hours, e.g. 1 to 4 hours. The diluent used will generally be an aliphatic hydrocarbon having a boiling point in the range −50 to 100° C. Preferred diluents include n-hexane, isobutane and propane, especially isobutane.

Hydrogen is also preferably fed into the reactor to function as a molecular weight regulator. The molar ratio between the feed of hydrogen and the feed of the ethylene into the reactor system is 1:10 000-1:10.

Preferably, the polymerization reaction is carried out as a continuous or semi-continuous process. Thus the monomers, diluent and hydrogen are preferably fed continuously or semi-continuously into the reactor. Preferably, the catalyst system is also fed continuously or semi-continuously into the reactor. Still more preferably polymer slurry is continuously or semi-continuously removed from the reactor. By semi-continuously is meant that addition and/or removal is controlled so they occur at relatively short time intervals compared to the polymer residence time in the reactor, e.g. between 20 seconds to 2 minutes, for at least 75% (e.g. 100%) of the duration of the polymerization.

Thus in a preferred process the catalyst system is preferably injected into the reactor at a rate equal to its rate of removal from the reactor. An advantage of the invention herein described, however, is that because less catalyst system can be used per kg of polymer produced, less catalyst system is removed from the reactor along with polymer. The interpolymers obtained directly from the polymerization therefore comprise less impurities deriving from the catalyst system.

When used with a 3-substituted $C_{4-10}$ alkene comonomer, the catalyst systems herein described gives a very high activity, enabling a high productivity (ton polymer/kg catalyst system). Consequently relatively low concentrations of catalyst system are required in the reactor. Preferably, the concentration of catalyst system in the slurry polymerization is less than 0.3 kg/ton slurry, still more preferably less than 0.2 kg/ton slurry, e.g. less than 0.1 kg/ton slurry. Preferably, the concentration of catalyst system is at least 0.01 kg/ton slurry. Preferably, the concentration of polymer present in the reactor during polymerization is in the range 15 to 55% wt based on total slurry, more preferably 25 to 50% wt based on total slurry. Such a concentration can be maintained by controlling the rate of addition of monomer, the rate of addition of diluent and catalyst system and, to some extent, the rate of removal of polymer slurry from the slurry reactor.

Solution Phase Polymerization

Polymerization may be conducted in solution (i.e. with the polymer in solution in a solvent), particularly when a catalyst system comprising a Ziegler Natta catalyst is used. The conditions for carrying out solution phase polymerization are well established in the art. The reaction temperature is preferably 120-250° C. The solvent is preferably a saturated $C_{6-10}$ hydrocarbon or a mixture thereof. The residence time in the reactor(s) is preferably in the range 1-30 minutes. The partial pressure of monomer is preferably 20-150 bar. The concentration of polymer is preferably 5-20% wt. In addition to solvent, comonomer(s) and catalyst system components, hydrogen may optionally be fed to the reactor.

Multireactor systems may optionally be employed. When used, multistage reactor systems are preferably in a parallel arrangement.

After polymerization, the liquids (solvent and comonomer) are preferably vaporized from the polymer. The polymer is preferably mixed with additives and pelletized as discussed in more detail below.

Multistage Polymerization

The interpolymer may be prepared in a single stage polymerization or in a multistage polymerization.

When a polymer is produced in a multistage process, the reactors may be in parallel or in series but arrangement in series is preferred, e.g. for slurry and gas phase polymerization. For solution polymerization, a parallel arrangement is preferred. If the polymer components are produced in a parallel arrangement in solution polymerization, their solutions are preferably mixed for homogenization before extrusion.

A multistage polymerization may comprise the above-described slurry polymerization in combination with one or more further polymerizations. Thus, for example, two slurry polymerizations can be carried out in sequence (e.g. in Mitsui, Hostalen or Innovene slurry processes) or a slurry polymerization stage can be followed by a gas phase polymerization stage as described above (e.g. in Borstar or Spheripol processes). Alternatively, a slurry polymerization may be preceded by a gas phase polymerization. A still further possibility is that two gas phase polymerizations are carried out in sequence.

When a polymer is produced in a sequential multistage process, using reactors coupled in series and using different conditions in each reactor, the polymer components produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima or at least a broadening of the molecular weight distribution of each polymer component by itself. The product of a multistage polymerization is usually a multimodal polyalkene.

Preferred conditions for the slurry and gas phase polymerizations in a multistage process are the same as those described above. It is possible, however, not to add comonomer to one stage of a multistage polymerization. When no comonomer is present in a stage of a multistage polymerization, the polymer component from that stage is an ethylene homopolymer.

Staged processes for polyethylene preferably produce a combination of a major component A of lower molecular weight and lower (especially preferred is zero when producing final products of density higher than 940 g/dm³) comonomer content and one major component B of higher molecular weight and higher comonomer content. Component A is preferably made in a reactor A' wherein the hydrogen level is higher and the comonomer level lower than in the reactor B' where component B is made. If reactor A' precedes B', it is preferred that hydrogen should be stripped off from the polymer flow from A' to B'. If reactor B' precedes A', then preferably no extra comonomer is added to reactor B', and it is preferred to remove a significant part of the non converted comonomer from the polymer flow from B' to A'. It is also preferred that the 3-substituted $C_{4-10}$ alkene is used in the reactor where the polymer with highest incorporation of comonomer is produced, and especially preferred in all the reactors of the process where comonomer is used.

When a two stage polymerization is utilized, the lower molecular weight polymer component is preferably produced in the slurry reactor as described in detail above. The higher molecular weight component may be produced in another slurry reactor or in a gas phase reactor. The higher molecular weight component is typically produced using a lower hydrogen/monomer feed. The reactors may be connected in parallel or in series, but preferably they are connected in series, especially if they are slurry or gas phase reactors or a combination of the two. Preferably, the same catalyst system is used in both reactors. Preferably, the catalyst system is only fed into the first reactor and flows from this, along with polymer, to the next reactor(s) in sequence. The higher molecular weight component may be an interpolymer (e.g. copolymer) or homopolymer. Preferably, it is a copolymer, and more preferably, it is a copolymer comprising a 3-substituted $C_{4-10}$ alkene as hereinbefore described.

Preferably, however, the interpolymer is made in a single stage polymerization. Still more preferably the interpolymer is made in a slurry phase polymerization.

Multimodal polymers may alternatively be prepared by using two or more different Ziegler Natta and/or chromium oxide catalysts in a single reactor or by using a multisite catalyst as described above.

Alternatively, multisite catalyst systems, as described above, may be used to prepare multimodal polymers. In this case, in order to achieve the optimum polymer properties, especially in a single reactor system, it is preferably for the multisite catalyst system to have as high a ratio as possible between the incorporation of a more incorporating comonomer on a site I and on another less incorporating site II. It has been surprisingly found that the 3-substituted $C_{4-10}$ alkene comonomer as hereinbefore described, for numerous combinations of active sites, gives a higher ratio compared to the corresponding reaction using conventional comonomers like 1-butene and 1-hexene. Utilizing 3-substituted $C_{4-10}$ alkene with a multisite catalyst system is therefore especially favorable.

Multimodal polymer may therefore be obtained in a single reactor or in a system of two or more reactors, e.g. in a staged reactor process. Preferably, however, a single reactor process (except optional prepolymerization reactors making less than 7% of the total polymer) is used.

A further possibility is to blend different interpolymers as hereinbefore described, e.g. prior to pelletisation. Blending is, however, less preferable to the production of multimodal polymer, e.g. by multistage polymerization.

Multimodal and Unimodal Polymers

Multimodal interpolymers as hereinbefore described, and especially those wherein the higher molecular weight polymer component A has a higher comonomer content than the lower molecular weight component B, may in some instances possess some advantages over unimodal interpolymers.

Compared to unimodal interpolymer, at the same density (stiffness) and at the same high ease of extrusion as regards extruder screw and die processes, a multimodal interpolymer comprising ethylene and a 3-substituted $C_{4-10}$ alkene may be prepared having a higher stress crack, brittle crack hoop stress failure and/or slow crack growth resistance. Such interpolymers are particularly useful in film applications wherein they enable improved impact resistance and often improved tear resistance.

Multimodal interpolymers as hereinbefore described may also exhibit improved sealing properties (e.g. lower minimum sealing temperature, sealing temperature range broadness) compared to an unimodal polymer of the same density and ease of extrusion. This is useful in the manufacture of films.

Downstream Requirements and Process

When the final polymer product is obtained from the reactor(s), the polymer is removed therefrom and liquid and/or volatile components are preferably separated from it by stripping, flashing and/or filtration. For instance, for slurry and gas phase processes, the polymer is removed from the reactor section and to remove volatiles, is preferably filtered or flashed. For slurry processes, the diluent is also preferably separated from the polymer by flashing or filtration.

Preferably, the polymer is not subjected to a deashing step, i.e. to washing with an alcohol, optionally mixed with a hydrocarbon liquid, or water.

Preferably, the polymer is dried (e.g. to remove residues of liquids and gases from the reactor).

In slurry and gas phase processes, in order that the polymer can be handled without difficulty, both within and downstream of the polymerization process, the polymer powder from the reactor(s) should be in a free-flowing state, preferably by having relatively large particles of high bulk density, e.g. less than 10% wt of the polymer being smaller than 100 μm size, and the dry, loose bulk density being higher than 300 kg/m$^3$.

For solution processes, the solvent is preferably removed by flashing and the melt conveyed directly to the pelletizer after additivation.

The major part of the liquid and gaseous components that leave the reactor(s) with the polymer, including unconverted comonomer, is recycled back to the polymerization section.

Preferably, these processes, from the polymerization until the pelletisation extruder outlet, are carried out under an inert (e.g. $N_2$) gas atmosphere. Prior to pelletisation, the polymer preferably contacts less than 1 kg/ton, still more preferably less than 0.1 kg/ton, water or alcohol. Prior to extrusion, the polymer preferably does not contact acid.

Additives and Pelletisation

Antioxidants are preferably added (process stabilizers and long term antioxidants) to the polymer, e.g. prior to pelletisation. Other additives (antiblocking agents, color masterbatches, antistatics, slip agents, fillers, UV absorbers, lubricants, acid neutralizers, fluoroelastomer and other polymer processing aids (PPA), UV stabilizers, acid scavengers, nucleating agents) may optionally be added to the polymer.

As antioxidant, all types of compounds known for this purpose may be used, such as sterically hindered or semi-hindered phenols, aromatic amines, aliphatic sterically hindered amines, organic phosphites/phosphonites and sulphur-containing compounds (e.g. thioethers).

Preferably, the antioxidant(s) is selected from the group of organic phosphites/phosphonites and sterically hindered or semi-hindered phenols, i.e. phenols which comprise two or one bulky residue(s), respectively, in ortho-position to the hydroxy group, and sulphur containing compounds.

Representative examples of sterically hindered phenolic compounds include 2,6-di-tert.-butyl-4-methyl phenol; pentaerythrityl-tetrakis(3-(3',5'-di-tert.-butyl-4-hydroxyphenyl)-propion-ate; octadecyl 3-(3',5'-di-tert.-butyl-4-hydroxyphenyl)propionate; 1,3,5-trimethyl-2,4,6-tris-(3,5-di-tert.-butyl-4-hydroxyphenyl)benzene; 2,2'-thiodiethylene-bis-(3,5-di-tert.-butyl-4-hydroxyphenyl)-propionate; calcium-(3,5-di-tert.-butyl-4-hydroxy benzyl monoethyl-phosphonate); 1,3,5-tris(3',5'-di-tert.-butyl-4'-hydroxybenzyl)-isocyanurate; bis-(3,3-bis-(4'-hydroxy-3'-tert.-butylphenyl)butanoic acid)-glycolester; 4,4'-thiobis(2-tert.-butyl-5-methylphenol); 2,2'-methylene-bis(6-(1-methyl-cyclohexyl)paracresol); n,n'-hexamethylene bis(3,5-di-tert. Butyl-4-hydroxy-hydrocinnamamide; 2,5,7,8-tetramethyl-2-(4',8',12'-trimethyltridecyl)chroman-6-ol; 2,2'-ethylidenebis(4,6-di-tert.-butylphenol); 1,1,3-tris(2-methyl-4-hydrosy-5-tert.-butylphenyl)butane; 1,3,5-tris(4-tert.-butyl-3-hydroxy-2,6-dimethylbenzyl)-1,3,5-triazine-2,4-,6-(1h,3h,5h)-trione; 3,9-bis(1,1-dimethyl-2-(beta-(3-tert.-butyl-4-hydroxy-5-methylphenyl)prop-ionyloxy)ethyl)-2,4,8,10-tetraoxaspiro (5,5) undecane; 1,6-hexanediyl-bis(3,5-bis(1,1-dimethylethyl)-4-hydroxybenzene-propanoate); 2,6-di-tert.-butyl-4-nonylphenol; 3,5-di-tert.-butyl-4-hydroxyhydrocinnamic acid triester with 1,3,5-tris(2-hydroxyethyl)-s-triazine-2,4,6 (1h,3h,5h)-trione; 4,4'-butylidenebis(6-tert.butyl-3-methylphenol); 2,2'-methylene bis(4-methyl-6-tert.-butylphenol); 2,2-bis(4-(2-(3,5-di-t-butyl-4-hydroxyhydrocinnamoyloxy)) ethoxyphenyl))propane; triethyleneglycole-bis-(3-tert.-butyl-4-hydroxy-5-methylphenyl)propionate; benzenepropanoic acid, 3,5-bis(1,1-dimethylethyl)-4-hydroxy-$c_{13-15}$-branched and linear alkyl esters; 6,6'-di-tert.-butyl-2,2'-thiodi-p-cresol; diethyl((3,5-bis(1,1-dimethylethyl)-4-hydroxyphenyl)methyl)phosphonate; 4,6-bis (octylthiomethyl)o-cresol; benzenepropanoic acid, 3,5-bis(1,1-dimethylethyl)-4-hydroxy-$c_{7-9}$-branched and linear alkyl esters; 1,1,3-tris[2-methyl-4-[3-(3,5-di-t-butyl-4-hydroxyphenyl)propionyloxy]-5-t-butylphenyl]butane; and a butylated reaction product of p-cresol and dicyclopentadiene.

Among those compounds, the following phenolic-type antioxidant compounds are especially preferred to be included in the polymers: pentaerythrityl-tetrakis(3-(3',5'-di-tert.-butyl-4-hydroxypheyl)-propionate; octadecyl 3-(3',5'-di-tert.-butyl-4-hydroxyphenyl)propionate; 1,3,5-trimethyl-2,4,6-tris-(3,5-di-tert.-butyl-4-hydroxyphenyl)benzene; 1,3,5-tris(3',5'-di-tert.-butyl-4'-hydroxybenzyl)isocyanurate, bis-(3,3-bis-(4'-hydroxy-3'-tert.-butylphenyl)butanoic acid)-glycolester; and 3,9-bis(1,1-dimethyl-2-(beta-(3-tert.-butyl-4-hydroxy-5-methylphenyl)propionyloxy)ethyl)-2,4,8,10-tetraoxaspiro(5,5)undecane.

Preferred organic phosphite/phosphonite antioxidants contain a phosphite moiety or a phosphonite moiety. Representative examples of preferred phosphite/phosphonite antioxidants include tris(2,4-di-t-butylphenyl)phosphite; tetrakis-(2,4-di-t-butylphenyl)-4,4'-biphenylen-di-phosphonite, bis(2,4-di-t-butylphenyl)-pentaerythrityl-di-phosphite; di-stearyl-pentaerythrityl-di-phosphite; tris-nonylphenyl phosphite; bis(2,6-di-t-butyl-4-methylphenyl) pentaerythrityl-di-phosphite; 2,2'-methylenebis(4,6-di-t-butylphenyl)octyl-phosphite; 1,1,3-tris(2-methyl-4-ditridecyl phosphite-5-t-butylphenyl)butane; 4,4'-butylidenebis(3-methyl-6-t-butylphenyl-di-tridecyl) phosphite; bis(2,4-dicumylphenyl)pentaerythritol diphosphite; bis(2-methyl-4,6-bis(1,1-dimethylethyl)phenyl)phosphorous acid ethylester; 2,2',2"-nitrilo triethyl-tris (3,3'5,5'-tetra-t-butyl-1,1'-biphenyl-2,2'-diyl)phosphite); phosphorous acid, cyclic butylethyl propandiol, 2,4,6-tri-t-butylphenyl ester; bis(2,4,6-tri-t-butylphenyl)-pentaerythrityl-di-phosphite; 2,2'-ethylidenebis(4,6-di-t-butylphenyl) fluorophosphonite, 6-(3-tert-butyl-4-hydroxy-5-methylphenyl)propoxy)-2,4,8,10-tetra-tert.but-yldibenz(d,t)

(1.3.2)dioxaphosphepin; and tetrakis-(2,4-di-t-butyl-5-methyl-phenyl)-4,4'-biphenylen-di-phosphonite.

Among the above-mentioned compounds, the following phosphite/phosphonite antioxidant compounds are preferred to be included in the polymers: tetrakis-(2,4-di-t-butylphenyl)-4,4'-biphenylen-di-phosphonite; bis(2,6-di-t-butyl-4-methylphenyl)pentaerythrityl-di-phosphite; di-stearyl-pentaerythrityl-di-phosphite; and bis(2,4-dicumylphenyl) pentaerythritol diphosphite.

As antioxidant either a single compound or a mixture of compounds may be used. Particularly preferably the polymer comprises a sterically hindered phenolic compound and a phosphite/phosphonite compound.

The skilled man can readily determine an appropriate amount of antioxidant to include in the polymers. As discussed above, however, the polymers comprise less catalyst system residues than a film of the same density and MFR made with 1-butene as comonomer thus it is possible to add less antioxidant thereto (i.e. the polymer possess increased inherent stability). Thus a sterically hindered phenolic antioxidant may be used in an amount of 200-1000 ppm wt, more preferably 300-800 ppm wt, e.g. 400-600 ppm wt or about 500 ppm wt. The amount of organic phoshite/phosphonite antioxidant present in the polymer is preferably 50-500 ppm wt, more preferably 100-350 ppm wt and most preferably 150-250 ppm wt.

The above-mentioned antioxidants are particularly preferred when the amount of transition metal present in the polymer is sufficient to accelerate oxidation reactions, e.g. when the level of transition metal in the polymer is more than 1 µmol transition metal per kg polymer, more typically more than 2 µmol transition metal per kg polymer, e.g. more than 6 µmol transition metal per kg polymer. Such levels of transition metals may occur as the interpolymers are often prepared without a washing (e.g. deashing) step.

Further preferred polymers comprise a lubricant. Preferred lubricants include fatty acid salts (e.g. Ca or Mg stearate) and polymer processing aids (PPAs). A preferred PPA is a fluoropolymer, e.g. as available from Dyneon as FX 5922. The amount of lubricant present in the polymer is preferably 100-500 ppm wt, more preferably 300-450 ppm wt.

The polymer or polymer mix is preferably extruded and granulated into pellets, preferably after addivation. In this step, any extruder known in the art may be used, however, twin screw extruders are preferred. A preferred twin screw extruder is a counter rotating twin screw extruder. Preferably, the resulting pellets have a high bulk density, e.g. more than 500 kg/m$^3$ and a low amount of fines, e.g. less than 10% wt of the polymer is smaller than 2 mm in size.

Interpolymer Production Advantage

As discussed above, it is known that the mechanical performance of polymer films is improved by increasing the molecular weight of comonomer in the order propylene, butene, hexene and octene. The higher the molecular weight of the comonomer, however, the harder it is to produce the copolymer economically.

To obtain pure polymer, the non-incorporated comonomer residues therein should be low. The higher the molecular weight of the comonomer, however, the higher its solubility in the polymer at a given partial pressure. For particle form polymerization processes (slurry and gas phase polymerization processes), the removal of non-incorporated monomer is typically done by counter current drying of the polymer powder with $N_2$, a process in which there is typically close to equilibrium between the comonomer in the gas and comonomer dissolved within the polymer phase. Thereafter an increase in the molecular weight of the comonomer makes the drying much more difficult and in practice, octene is not used in particle form polymerization for this reason. 1-hexene and 1-butene are therefore most commonly used, especially 1-butene, which can be stripped off relatively easily, i.e. with reasonable low feed of $N_2$ compared to the polymer flow, at a temperature somewhat below the lumping temperature of the polymer powder.

A further advantage of the films of the invention is therefore that they comprise a 3-substituted $C_{4-10}$ alkene such as 3-methyl-1-butene that is more volatile than hexene and octene and is therefore easier to strip from the polymer product.

Interpolymer Composition and Properties

The amount of ethylene monomer present in the interpolymer is preferably 60-99.99% wt, more preferably 70-99.9% wt, still more preferably 80-99.5% wt, e.g. 93-99.0% wt.

The amount of 3-substituted $C_{4-10}$ alkene (e.g. 3-methyl-1-butene) monomer present in the interpolymer is preferably 0.01 to 40% wt, more preferably 0.1-30% wt, still more preferably 0.5-20% wt, e.g. 0.5-6.5% wt or less than 7% wt. If the interpolymer comprises two types of $C_{2-8}$ alkenes (e.g. ethylene and 1-butene), the $C_{2-8}$ alkene in the minor amount (e.g. 1-butene) is preferably present in an amount 0.1-20% wt, still more preferably 0.5-10% wt, e.g. 1-7% wt.

When it is stated herein that the amount of a given monomer present in a polymer is a certain amount, it is to be understood that the monomer is present in the polymer in the form of a repeat unit. The skilled man can readily determine what is the repeat unit for any given monomer.

Preferably, the interpolymer has a crystallinity as measured by DSC of 10-90%, more preferably 15-75%, most preferably 25-70%.

The density of the interpolymer is preferably in the range 890-965 kg/m$^3$, still more preferably in the range 915-950 kg/m$^3$, e.g. 925-940 kg/m$^3$.

The $MFR_2$ of the interpolymer is preferably in the range 0.002-2000 g/10 min, more preferably in the range 0.05-500 g/10 min, still more preferably 0.15-49 g/10 min, e.g. 0.3-5 g/10 min.

The $MFR_{21}$ of the interpolymer is preferably greater than 0.05 g/10 min, more preferably greater than 0.1 g/10 min, still more preferably greater than 1 g/10 min.

The melting temperature of the interpolymer is preferably in the range 110-140° C., still more preferably in the range 115-135° C., e.g. 120-130° C.

The Mn of the interpolymer of the invention is preferably in the range 5000-200 000 g/mol, still more preferably in the range 8 000-100 000 g/mol, e.g. 12 000-50 000 g/mol.

The Mw of the interpolymer is preferably in the range 30 000-800 000 g/mol, still more preferably in the range 50 000-150 000 g/mol, e.g. 90 000-130 000 g/mol.

The Mw/Mn of the interpolymer is preferably in the range 4-50, more preferably in the range 5-30, e.g. 6-15.

Preferably, the interpolymer of the present invention is unimodal.

The interpolymer as hereinbefore described is also particularly suited for crosslinking compared to other single site or Ziegler Natta polymers made using conventional, linear alkenes as comonomers. Crosslinking may be carried out on the articles in their final geometric form, e.g. through the use of radicals, either by radiation, primarily gamma radiation or at high temperature by peroxides decomposition.

The interpolymer is obtained with high purity. Thus the interpolymer contains only very low amounts of catalyst or catalyst system residues (i.e. ash). Preferably, the amount of catalyst system ash in the interpolymer, and therefore film, is less than 1000 ppm wt, still more preferably less than 500 ppm wt, e.g. less than 300 ppm wt. By the catalyst system ash is meant the ash from the active site precursor, activator, carrier or other catalyst particle construction material and any other components of the catalyst system present in the polymer after polymerization and prior to any washing, deashing or additivation step.

Transition metals are harmful in films in far lower concentrations since they act as accelerators for degradation of the polymer by oxygen and temperature, giving discoloration and reducing or destroying mechanical properties. A particular advantage of the films of the present invention is that they contain very low amounts of transition metal. The interpolymers, and therefore films, preferably comprise less than 300 µmol transition metal per kg polymer, more preferably less than 200 µmol transition metal per kg polymer, still more preferably less than 150 µmol transition metal per kg polymer, e.g. less than 100 µmol transition metal per kg polymer.

Film Preparation

Optional further polymer components and/or additives may be added to the polymer at the film extrusion stage, especially polymer processing aids, external lubricants and antiblocking agents. Preferably, further polymer components are added as is discussed in more detail below.

The films of the present invention may be monolayer or multilayer films. To form multilayer films, the interpolymer composition hereinbefore described may be coextruded, i.e. the interpolymer composition as hereinbefore described is fed into the film extrusion die with at least one other film material, each from a separate feed extruder, to make a multilayer film, containing two or more layers. After the extrusion process itself (whether to produce a monolayer or multilayer film), the film can be monoaxially or biaxially stretched to improve mechanical and optical properties.

Alternatively, films may be prepared by lamination. Multilayer films may, for example, be prepared by lamination of a coextruded multilayer film.

The films of the present invention may be prepared by any conventional procedure, e.g. casting or blowing. Preferably, the films are prepared by blowing.

Cast Film

The films of the present invention may be prepared by using casting techniques, such as a chill roll casting process. For example, a composition comprising the interpolymer hereinbefore described can be extruded in a molten state through a flat die and then cooled to form a film. The skilled man is aware of typical casting conditions. Typically, however, extrusion is carried out at a temperature in the range 150 to 350° C., the die gap is in the range 500-1300 µm and the draw down ratio is in the range 50-200. Cooling is preferably carried out at a temperature of 0-35° C.

As a specific example, cast films can be prepared using a pilot scale commercial cast film line machine as follows. Pellets of the interpolymer composition are melted at a temperature ranging from about 200 to 260° C., with the specific melt temperature being chosen to match the melt viscosity of the particular polymers. In the case of a multilayer cast film, the two or more different melts are conveyed to a co-extrusion adapter that combines the two or more melt flows into a multilayer, co-extruded structure. This layered flow is distributed through a single manifold film extrusion die to the desired width. The die gap opening is typically about 600 µm. The material is then drawn down to the final gauge. The material draw down ratio is typically about 21:1 for 40 µm films. A vacuum box or air knife may then be used to pin the melt exiting the die opening to a primary chill roll maintained at about 32° C. The resulting polymer film is collected on a winder. The film thickness may be monitored by a gauge monitor and the film may be edge trimmed by a trimmer. One or more optional treaters can be used to surface treat the film, if desired.

A chill roll casting process and apparatus that can be used to form a film of the present invention suitably modified in accordance with the above-described processing parameters is in The Wiley Encyclopedia of Packaging Technology, Second Edition, A. L. Brody and K. S. Marsh, Ed., John Wiley and Sons, Inc., New York (1997).

Although chill roll casting is one example, other forms of casting can be used.

Blown Film

The films of the invention are preferably prepared by blowing according to procedures well known in the art. Thus the film may be produced by extrusion through an annular die and blowing (e.g. with air) into a tubular film by forming a bubble which is collapsed between nip rollers after solidification. The film can then be slit, cut or converted (e.g. sealed) as required. Conventional film production techniques may be used in this regard.

The skilled man is aware of typical blowing conditions. Typically, however, extrusion is carried out at a temperature in the range 160 to 240° C. and cooled by blowing gas (e.g. air) at a temperature of 10 to 50° C. to provide a frost line height of up to 10 times, typically 2 to 8 times the diameter of the die. The blow up ratio should generally be in the range 2 to 5, preferably 2.5 to 4.

As a specific example, blown films can be prepared as follows. The interpolymer composition hereinbefore described is introduced into a feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that is cooled by blowing air onto the surface of the film. The film is drawn from the die typically forming a cylindrical film that is cooled, collapsed and optionally subjected to a desired auxiliary process, such as slitting, treating, sealing and/or printing. The finished film can be wound into rolls for later processing or can be fed into a bag machine and converted into bags.

Apparatus for making a blown film according to the present invention is available from e.g. Windmöller & Hölscher and from Alpine. Of course, other blown film forming equipment and corresponding methods can also be used.

Film Structure and Composition

The product from the film forming process may be a monolayer film or a film comprising two or more layers (i.e. a multilayer film). In a multilayer film, the polymer composition of one layer is typically different from that of adjacent layers, e.g. it comprises different components or the same components in different ratios.

In the case of monolayer films, they may consist of the above-described interpolymer composition, i.e. it may not comprise any other polyalkene component. Alternatively, the interpolymer composition may be blended with one or more polymer components.

In the case of a multilayer film, one or more of its layers may consist of the above-described interpolymer composition, i.e. said layer may not comprise any other polyalkene component. Alternatively, the interpolymer composition may be blended with one or more polymer components.

Other Polymer Components

The films (monolayer and multilayer) of the present invention may therefore comprise one or more polyalkene components. The film may, for example, comprise a low density polyethylene (LDPE). In the case of a multilayer film, the LDPE may be present in one or more (e.g. all) of its layers.

LDPE is prepared using a well known high pressure radical process using a radical generating compound such as peroxide. The skilled polymer chemist appreciates that LDPE is a term of the art. Both LDPE made in tubular and in autoclave reactors may be used, including its copolymers, e.g. Ethylene vinyl acrylate (EVA), ethylene methyl acrylate (EMA), ethylene butyl acrylate (EBA) and ethylene ethyl acrylate (EEA) copolymers.

The LDPE present in the films of the present invention preferably has a density in the range 915-937 kg/m$^3$, still more preferably 918-930 kg/m$^3$, e.g. 920-924 kg/m$^3$.

The LDPE present in the films of the present invention preferably has a MFR$_2$ in the range 0.2-4 g/10 min, still more preferably 0.5-2 g/10 min, e.g. 0.7-1.0 g/10 min.

The amount of LDPE present in a monolayer film of the invention may be 2 to 60% wt, more preferably 3 to 50% wt, still more preferably 4-25% wt, e.g. 6-15% wt.

In the case of multilayer films, the amount of LDPE present in any given layer may be 2 to 60% wt, more preferably 3 to 50% wt, still more preferably 4-25% wt, e.g. 6-15% wt.

Further Additives

The films of the present invention may additionally comprise conventional additives such as antioxidants, antiblocking agents, color masterbatches, antistatics, slip agents (external lubricants), fillers, UV absorbers, internal lubricants, acid neutralizers, fluoroelastomer and other polymer processing aids (PPA), UV stabilizers, acid scavengers, nucleating agents, etc. In the case of a multilayer film, the additives may be present in one or more (e.g. all) of its layers.

Preferred films may comprise external lubricants (slip agents), e.g. erucamide or oleamide, to decrease film friction. External lubricant should preferably be present in an amount of 300-1500 ppm wt.

Film Thickness

In the case of a multilayer film, each film layer may have a thickness of, e.g. 2-200 μm, preferably 5-70 μm, more preferably 15-40 μm e.g. 20-35 μm.

The total thickness of the film (monolayer or multilayer) is not critical and depends on the end use. Thus films may have a thickness of, e.g. 10-300 μm, preferably 15-150 μm, more preferably 20-70 μm, e.g. 30-60 μm.

Film Properties

The films of the invention have a desirable balance of properties.

The films of the invention exhibit reasonable dart impact strength. Dart drop (ISO 7765/1) may be at least 1 g/μm, preferably at least 1.1 g/μm, still more preferably at least 1.2 g/μm, e.g. at least 1.3 g/μm. The upper limit of dart drop is not critical and may be, e.g. 10 g/μm. In particular for a 40 μm blown film consisting of an interpolymer as hereinbefore described and particularly in the case of a film prepared according to example 1 below, dart drop (ISO 7765/1) is preferably at least 1 g/μm, preferably at least 1.1 g/μm, still more preferably at least 1.2 g/μm, e.g. at least 1.3 g/μm.

The films of the invention exhibit excellent tensile strength. MD (machine direction) tensile strength (ISO 527-3) may be at least 29 MPa, preferably at least 32 MPa, still more preferably at least 34 MPa, e.g. at least 36 MPa. The upper limit of MD tensile strength is not critical and may be, e.g. 100 MPa. In particular for a 40 μm blown film consisting of an interpolymer as hereinbefore described and particularly in the case of a film prepared according to example 1 below, MD tensile strength (ISO 527-3) is preferably at least 29 MPa, preferably at least 32 MPa, still more preferably at least 34 MPa, e.g. at least 36 MPa.

TD (transverse direction) tensile strength (ISO 527-3) may be at least 27 MPa, preferably at least 30 MPa, still more preferably at least 32 MPa, e.g. at least 34 MPa. The upper limit of TD tensile strength is not critical and may be, e.g. 100 MPa. In particular for a 40 μm blown film consisting of an interpolymer as hereinbefore described and particularly in the case of a film prepared according to example 1 below, TD tensile strength (ISO 527-3) is preferably at least 27 MPa, preferably at least 30 MPa, still more preferably at least 32 MPa, e.g. at least 34 MPa.

The films of the invention exhibit excellent tear strength. MD (machine direction) Elmendorf tear resistance (ISO 6383/2) may be at least 0.018 N/μm, preferably at least 0.022 N/μm, still more preferably at least 0.025 N/μm, e.g. at least 0.027 N/μm. The upper limit of tear resistance is not critical and may be, e.g. 0.2 N/μm. In particular for a 40 μm blown film consisting of an interpolymer as hereinbefore described and particularly in the case of a film prepared according to example 1 below, MD tear strength (ISO 6383/2) is preferably at least 0.7 N, preferably at least 0.8 N, still more preferably at least 0.95 N, e.g. at least 1.05 N.

TD (transverse direction) Elmendorf tear resistance (ISO 6383/2) may be at least 0.03 N/μm, preferably at least 0.04 N/μm, still more preferably at least 0.05 N/μm, e.g. at least 0.06 N/μm. The upper limit of tear resistance is not critical and may be, e.g. 4 N/μm. In particular for a 40 μm blown film consisting of an interpolymer as hereinbefore described and particularly in the case of a film prepared according to example 1 below, TD tear strength (ISO 6383/2) is preferably at least 1.7 N, preferably at least 1.9 N, still more preferably at least 2.1 N, e.g. at least 2.3 N.

Particularly preferred films (e.g. 40 μm thick) of the invention satisfy the following equation:

$$\text{Tear} > A \cdot (\text{Thickness}) \cdot 10^{B \cdot (\text{Density} - 935)} \cdot \text{MFR2}^C$$

wherein tear is Elmendorf tear measured according to ISO 6383/2 and given in N, thickness is in μm, density is measured according to ISO 1183:1987 (E), method D and is in g/dm$^3$, MFR$_2$ is measured according to ISO 1133 and is given in g/10 min and. In MD direction, B is −0.045, C is −0.2 and A is 0.015 and in particularly preferred films A is 0.017, more preferably 0.19 and still more preferably 0.021. In TD direction, B is −0.02, C is −0.3 and A is 0.04 and in particularly preferred films A is 0.045, more preferably 0.050 and still more preferably 0.055.

The films of the invention additionally exhibit high tensile modulus properties (0.05-1.05%, ASTM D 882-A) in the machine and transverse directions. These are preferably 250-600 MPa, more preferably 320-450 MPa, e.g. 360-400 MPa, particularly for a 40 μm blown film consisting of the interpolymer as hereinbefore described, and especially in the case of a film prepared according to example 1 below.

The films of the invention also preferably have a high strain at break in both machine and transverse directions, e.g. at least 600% in either direction (MD/TD), particularly for a 40 μm blown film consisting of the interpolymer as hereinbefore described and especially in the case of a film prepared according to example 1 below.

The films of the invention preferably exhibit low haze. Haze (ASTM D 1003) may be less than 40%, preferably less than 45%, e.g. less than 30%, particularly for a 40 μm blown film consisting of the interpolymer as hereinbefore described and especially in the case of a film prepared according to example 1 below. The lower limit of haze is not critical and may be, e.g. 1%.

The films of the invention preferably exhibit high gloss. Gloss (ASTM D 2457) may be greater than 60%, preferably greater than 65%, e.g. greater than 70%, particularly for a 40 µm blown film consisting of the interpolymer as hereinbefore described and especially in the case of a film prepared according to example 1 below. The upper limit of gloss is not critical and may be, e.g. 120%.

Film Applications

Industrial Films

The films of the present invention may be used as industrial films, e.g. as industrial packaging films and as non packaging industrial films. Examples of industrial packaging films include, for example, shipping sacks e.g. heavy duty shipping sacks (HDSS), stretch hoods, stretch wraps, liners and industrial shrink film. Examples of non packaging industrial films include, for example, building and constructing films (e.g. air and moisture membranes, barrier films and geomembranes), agricultural films, protection films and technical films.

Preferably, the films of the invention are used in packaging. Heavy duty shipping sacks may, for example, be used for packaging sand, cement, stones, compost, polymer pellets etc.

The film used for the production of industrial film may be a monolayer film. In this case, the $MFR_2$ of the interpolymer composition from which it is formed is preferably 0.2-3 g/10 min, more preferably 0.4-2.5 g/10 min and still more preferably 0.5-2 g/10 min. The density of the interpolymer composition is preferably 900-950 g/dm$^3$, more preferably 915-945 g/dm$^3$ and more preferably 920-940 g/dm$^3$.

More preferably, however, the film used for the production of industrial film is a multilayer film, preferably obtained by coextrusion. By utilizing more than one layer, the properties of the overall film may be optimized to a greater extent than with a single layer (monolayer) structure. This means that the film can be made thinner without sacrificing important properties.

A preferred multilayer film for use in industrial film has the structure aba wherein:

(a): outer layer (b): core layer or core layers (b1b2b3)

(a): outer layer

Layers (a) preferably comprises 10-100% wt of the interpolymer composition hereinbefore described, more preferably 50-100% wt and still more preferably 70-95% wt. Still more preferably at least one of the layers (a) and more preferably both additionally comprise 3-30% wt, more preferably 5-20% wt LDPE as hereinbefore described. Preferably, the LDPE component has a density of 880-930 kg/dm$^3$ and a $MFR_{21}/MFR_2$ greater than 30.

The interpolymer as hereinbefore described that is present in the layers (a) preferably has a $MFR_2$ of 0.2-3 g/10 min, more preferably 0.5-2 g/10 min and still more preferably 0.7-1.5 g/10 min. The density of the interpolymer is preferably 900-945 g/dm$^3$, more preferably 910-940 g/dm$^3$ and still more preferably 920-937 g/dm$^3$.

A LDPE polymer optionally present in layers (a) preferably has a $MFR_2$ of 0.2-3 g/10 min, more preferably 0.5-2 g/10 min and still more preferably 0.7-1.5 g/10 min. The density of the LDPE is preferably 905-930 g/dm$^3$, more preferably 910-926 g/dm$^3$ and still more preferably 917-924 g/dm$^3$.

The polymer composition of the layers (a) preferably has a $MFR_2$ of 0.2-3 g/10 min, more preferably 0.5-2 g/10 min and still more preferably 0.7-1.5 g/10 min. The density of the polymer composition of the layers (a) is preferably 890-940 g/dm$^3$, more preferably 900-935 g/dm$^3$, still more preferably 910-930 g/dm$^3$.

Layers (a) may optionally contain further polymer components.

The layers (a) may have the same or different compositions, but it is preferred if the layers (a) have the same composition.

One or both of layers (a) may be used for printing. Layer(s) (a) preferably has good sealing properties.

Layer (b) may be any polymer that can be formed into a film. It may function e.g. to provide mechanical properties (impact strength and stiffness) or barrier properties. It may consist of several layers, e.g. 3, 5, 7 or 9 layers.

The following polymers are especially well suited for inclusion in layer (b): Polyethyleneterephtalate (PET), polyamides (PA), ethylene vinyl alcohol (EVOH), polypropylene (including oriented polypropylene (OPP) and biaxially oriented polypropylene (BOPP)) and polyethylene (included oriented polyethylene (OPE).

The layer(s) (b) may also comprise a polyethylene, particularly a polyethylene interpolymer as hereinbefore described. The interpolymer composition present in this layer preferably has a $MFR_2$ of 0.1-4 g/dm$^3$, more preferably 0.3 to 2 g/10 min, and still more preferably 0.2 to 1.5 g/10 min. The density of the interpolymer composition is preferably 900 g/dm$^3$ to 955 g/dm$^3$, more preferably 920 to 945 g/dm$^3$ and still more preferably 920-940 g/dm$^3$. Preferably, the interpolymer composition present in layer(s) (b) has a lower $MFR_2$ and a lower density than the average of the polyethylene polymer present in the layer.

The total thickness of the film of this embodiment (i.e. an industrial film) is preferably 15-300 µm, more preferably 25-250 µm, still more preferably 40-200 µm.

If the film has 3 or more layers, then preferably layers (a) should each be 5-30% of the total thickness of the multilayer film, and layer or layers (b) totally 25-90% of the total thickness. Thus the thickness of each layer (a) is preferably 10-30 µm. The thickness of layer (b) is preferably 25-60 µm.

Laminates

The film of the invention may also be incorporated into a laminate. In the process of lamination a film is adhered to a substrate. The film that is used in the lamination process is herein referred to as a lamination film. The resulting product is referred to herein as a laminate.

Lamination Film

The lamination film may be a monolayer film or a multilayer film. Preferably, the lamination film is a multilayer film, preferably formed by coextrusion.

The lamination film may, for example, have a coextruded layer structure AC:

A outer layer; and

C inner layer, wherein the inner layer is adjacent to the substrate.

More preferably the lamination film may have a coextruded structure ABC:

A outer layer;

B core layer;

C inner layer, wherein the inner layer is adjacent to the substrate.

The inner layer C preferably comprises 10-100% wt of the interpolymer composition hereinbefore described, more preferably 50-100% wt and most preferably 70-95% wt. Still more preferably the inner layer C additionally comprises 3-30% wt, more preferably 5-20% wt LDPE as hereinbefore described. Preferably, the LDPE component has a density of 880-930 kg/dm$^3$ and a $MFR_{21}/MFR_2$ greater than 30. The inclusion of such a component typically improves the processability of the polymer composition.

The interpolymer as hereinbefore described that is present in the inner layer C preferably has a $MFR_2$ of 0.2-3 g/10 min, more preferably 0.5-2 g/10 min and still more preferably 0.7-1.5 g/10 min. The density of the interpolymer is preferably 900-950 g/dm$^3$, more preferably 910-945 g/dm$^3$ and still more preferably 920-940 g/dm$^3$.

A LDPE polymer optionally present in inner layer C preferably has a MFR$_2$ of 0.2-3 g/10 min, more preferably 0.5-2 g/10 min and still more preferably 0.7-1.5 g/10 min. The density of the LDPE is preferably 905-930 g/dm$^3$, more preferably 910-926 g/dm$^3$ and still more preferably 917-924 g/dm$^3$.

The polymer composition of the inner layer C preferably has a MFR$_2$ of 0.2-3 g/10 min, more preferably 0.5-2 g/10 min and still more preferably 0.7-1.5 g/10 min. The density of the polymer composition of the inner layer C is preferably 890-940 g/dm$^3$, more preferably 900-935 g/dm$^3$, still more preferably 910-930 g/dm$^3$.

Layer C may optionally contain further polymer components.

The outer layer A preferably has good sealing properties since this side of the laminate is typically subjected to a sealing process, e.g. in the production of pouches and bags. Preferably, outer layer A also has good optical properties, namely haze and gloss, especially gloss. Optionally, there is an additional substrate on top of layer A, but preferably, A is a free surface.

In AC lamination films, the layers A and C must be different. In ABC lamination films, preferably outer layer A is identical to inner layer C. Thus preferred features of layer C are also preferred features of layer A. A preferred lamination film structure is therefore ABA.

The core layer B may be any polymer that can be formed into a film. It may function e.g. to provide mechanical properties (rupture properties and stiffness) and barrier properties (oxygen, water, flavor). It may consist of several layers.

The following polymers are especially well suited for inclusion in layer B: polyethyleneterephtalate (PET), polyamides (PA), ethylene vinyl alcohol (EVOH), polypropylene (including oriented polypropylene (OPP) and biaxially oriented polypropylene (BOPP)) and polyethylene (included oriented polyethylene (OPE)).

If the core layer B consists of more than one layer, it preferably consists of 3, 5, 7 or 9 layers. In such a case, the layers preferably are symmetric so that in a 3 layer composition B1B2B3, layers B1 and B3 are identical.

The total thickness of the lamination film is preferably 10-150 µm, more preferably 15-90 µm and still more preferably 20-70 µm.

If the film has 3 or more layers, then preferably layer A and C should each be 5-30% of the total thickness of the multilayer film, and layer or layers B totally 25-90% of the total thickness. Thus the thickness of layers A and C is preferably 10-30 µm. The thickness of layer B is preferably 25-60 µm.

If the film has 2 layers A and B, then preferably each layer should be 10-90% of the total thickness of the film, more preferably 20-80% and most preferably 30-70%. Thus the thickness of layer A is preferably 20-60 µm. The thickness of layer B is preferably 50-120 µm.

Substrate

The substrate used in the preparation of the laminate preferably comprises polyethyleneterephtalate (PET), polyamides (PA), ethylene vinyl alcohol (EVOH), polypropylene, polyethylene, metal, especially aluminium, paper or cardboard. The substrate may also comprise more than one layer, e.g. metalized (aluminized) polymer, or aluminium foil coated with polyethylene. The thickness of the substrate is preferably 3-100 µm, more preferably 4-50 µm, still more preferably 5-30 µm.

Print may optionally be applied on the surface of the lamination film, preferably to a layer A therein, before the lamination process. Alternatively, print may be applied to the surface of the substrate. In the latter case the print is protected from mechanical influence and from solvent/chemical action by the lamination film, but is still visible through a transparent lamination film.

Laminate and Lamination

The lamination film is preferably laminated onto the substrate after the lamination film has been formed. Lamination film may optionally be adhered to both sides of a substrate.

Lamination may be carried out by a continuous process where lamination film(s) and substrate are pressed against each other at elevated temperature. Typical temperatures used may be 150-300° C. Neither the lamination film nor the substrate melts during the lamination process. Often, in addition to the layers previously mentioned, a layer (e.g. 0.5-5 µm thick) of adhesive is applied to the surface of at least one of the surfaces to be laminated together. Suitable equipment for lamination can be bought from Windmöller & Hölscher and from Macchi.

The laminates of the invention have a wide variety of applications but are of particular interest in packaging of food and drink as well as packaging of consumer and industrial goods. In food packaging the laminates of the invention may, for example, be used for the packaging of pasta, milk powder, snack food, coffee bags, margarine and frozen food. In consumer goods packaging, the laminates of the invention may be used for packaging detergent powder and toothpaste as well for the manufacture of stand-up pouches for, e.g. for pet food, beverages etc.

Having generally described this invention, a further understanding can be obtained by reference to certain specific examples which are provided herein for purposes of illustration only, and are not intended to be limiting unless otherwise specified.

EXAMPLES

Determination Methods

Polymers

Unless otherwise stated, the following parameters were measured on polymer samples as indicated in the Tables below.

MFR$_2$, MFR$_5$ and MFR$_{21}$ were measured according to ISO 1133 at loads of 2.16, 5.0, and 21.6 kg respectively. The measurements were at 190° C. for polyethylene interpolymers and at 230° C. for polypropylene interpolymers.

Molecular weights and molecular weight distribution, Mn, Mw and MWD were measured by Gel Permeation Chromatography (GPC) according to the following method: The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150 CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 µl of sample solution were injected per analysis. The column set was calibrated using universal calibration (according to ISO 16014-2:2003) with 15 narrow molecular weight distribution polystyrene (PS) standards in the range of 1.0 kg/mol to 12 000 kg/mol. These standards were from Polymer Labs and had Mw/Mn from 1.02 to 1.10. Mark Houwink constants were used for polystyrene and polyethylene (K: $9.54 \times 10^{-5}$ dL/g and a: 0.725 for PS and K: $3.92 \times 10^{-4}$ dL/g and a: 0.725 for PE). All samples were prepared by dissolving 0.5-3.5 mg of polymer in 4 mL (at 140° C.) of stabilized TCB (same as mobile phase) and keeping for 3 hours at 140° C. and for another 1 hour at 160° C. with occasional shaking prior to sampling into the GPC instrument.

Melting temperature was measured according to ISO 11357-1 on Perkin Elmer DSC-7 differential scanning calorimetry. Heating curves were taken from −10° C. to 200° C. at 10° C./min. Hold for 10 min at 200° C. Cooling curves were taken from 200° C. to −10° C. at 10° C. per min. Melting temperature was taken as the peak of the endotherm of the second heating. The degree of crystallinity was calculated by dividing the observed melting peak with the heat of melting of a perfectly crystalline polyethylene, i.e. 290 J/g.

Comonomer content (wt %) was determined based on Fourier transform infrared spectroscopy (FTIR) determination (using a Perkin Elmer Spectrum GX instrument) calibrated with C13-NMR.

Methyl groups (1/10 000 C) was determined by C13-NMR.

Density of materials is measured according to ISO 1183: 1987 (E), method D, with isopropanol-water as gradient liquid. The cooling rate of the plaques when crystallizing the samples was 15 C/min. Conditioning time was 16 hours.

Rheology of the polymers was determined by frequency sweep at 190° C. under nitrogen atmosphere according to ISO 6721-10, using Rheometrics RDA II Dynamic Rheometer with parallel plate geometry, 25 mm diameter plate and 1.2 mm gap. The measurements gave storage modulus (G'), loss modulus (G") and complex modulus (G*) together with the complex viscosity ($\eta^*$), all as a function of frequency ($\omega$). These parameters are related as follows: For any frequency $\omega$: The complex modulus: $G^* = (G'^2 + G''^2)^{1/2}$. The complex viscosity: $\eta^* = G^*/\omega$. The denomination used for modulus is Pa (or kPa) and for viscosity Pa s and frequency (1/s). $\eta^*_{0.05}$ is the complex viscosity at a frequency of $0.05$ s$^{-1}$ and $\eta^*_{300}$ is the complex viscosity at 300 s$^{-1}$.

According to the empirical Cox-Merz rule, for a given polymer and temperature, the complex viscosity as function of frequency measured by this dynamic method is the same as the viscosity as a function of shear rate for steady state flow (e.g. a capillary).

The activity coefficient for the bench scale polymerization runs is calculated by the following equation:

$$\text{Activity\_coefficient(kg/(g, bar, } h)) = \frac{(\text{Yield\_of\_polymer\_(kg)})}{(\text{Catalyst\_amount\_(g)}) \cdot (\text{Partial\_pressure\_of\_ethylene\_(bar)}) \cdot (\text{Polymerisation\_time\_}(h))}$$

For continuous polymerizations, the activity coefficient is analogous by using production rate of polymer instead of yield of product and feed rate of catalyst system instead of amount fed catalyst system, and using the average residence time in the continuous reactor.

Mechanical Properties on Compression Moulded Specimens

Secant modulus is measured according to ASTM D 882-A at a temperature of 23° C. and a speed of 1 mm/min.

Tensile properties (tensile stress at yield, tensile strain at yield, tensile strength at break, tensile strain at break) on compression moulded samples are measured at 23° C. according to ISO 527-2, the modulus is measured at a speed of 1 mm/min, while yield and break point properties at 50 mm/min. The specimens for this test are made according to ISO 1872-2 with cooling rate 15° C./min.

For Charpy impact are used compression moulded specimens made according to ISO 10350-1 (1998 Nov. 15)-option ISO 179-1 with V-notch type A. These are tested on impact according to ISO 179 at 23° C.

Films

Unless otherwise stated, the following parameters were measured at 23° C. on 40 μm thick films prepared as described in the examples.

Dart is measured according to drop: ISO 7765/1.

Haze is measured according to ASTM D 1003.

Gloss is measured according to ASTM D 2457. Measured at light angle of 60°.

Minimum fusion temperature (sealing property): Minimum fusion temperature (cold sealing) of film was measured using a CeraTek welding equipment. Film is welded in 8 welding zones with 5° C. differences between zones for 1 second at 2 bar pressure. After cooling, films are cut in 15 mm breadth and weld manually pulled apart. Minimum fusion temperature is the minimum temperature at which weld survives until the film itself stretches.

Puncture resistance is measured according to ASTM D5748.

Secant modulus is measured according to ASTM D 882-A, and calculated from the values at 0.05 and 1.05% strain.

Tensile stress, tensile strain and tensile strength is measured according to ISO 527-3.

Elmendorf tear strength is measured according to ISO 6383/2

EXAMPLES

Example 1

Gas Phase Polymerization Using a Ziegler Natta Catalyst System

A conventional Ziegler Natta catalyst, with Ti as transition metal, was used.

TEAL (triethyl aluminium): 10% wt in heptane

Polymerization Method

Polymerization was carried out in a 5.3 liter reactor fitted with a stirrer and a temperature control system. The same comonomer feeding system was used for all runs. The procedure consisted of the following steps:

1. 260 ml liquid propane was added to the reactor and stirring started (300 rpm). The reactor temperature was 85° C., which temperature was maintained during the polymerization.

2. Hydrogen, ethylene and comonomer were added into the reactor. Hydrogen was added as a batch. The pressure was maintained at the required pressure by supply of ethylene via a pressure control valve. Comonomer was also added continuously into the reactor, proportional to the ethylene flow.

3. Catalyst system was added. The cocatalyst triethylaluminum (TEA) was fed as 1M solution in heptane.

4. The polymerization was stopped by venting the reactor of volatiles and reducing the temperature.

5. The polymer was further dried in a vacuum oven at 70° C. for 30 minutes.

Further details of the polymerization procedure and details of the resulting interpolymers are provided in Table 1 below.

TABLE 1

| | | Polymerization run no. | | | |
|---|---|---|---|---|---|
| | | 1 | 2 | 3 | 4 |
| POLYMERIZATION | | | | | |
| Solid catalyst feed | G | 0.262 | 0.258 | 0.253 | 0.253 |
| TEA (1M) solution | Ml | 3.2 | 3.2 | 3.4 | 3.4 |
| Total pressure | bar g | 22 | 22 | 21 | 21 |
| Hydrogen partial pressure start | bar g | 0.5 | 0.5 | 0.5 | 0.5 |
| Comonomer type* | | M1B | M1B | Butene | Butene |
| Comonomer start | Ml | 10 | 10 | 5.5 | 8.25 |
| Comonomer (continuous) | g/100 g ethylene | 15 | 20 | 5/7/5/7/10/7 | 10/10/5/10/10/10 |
| Run time | Min | 180 | 180 | 180 | 180 |
| Yield | G | 1 410 | 1 490 | 542 | 382 |
| Productivity 1 | kg PE/(g solid cat.) | 5.4 | 5.8 | 2.1 | 1.5 |
| Productivity 2 | kg PE/(g cat. system) | 2.3 | 2.4 | 0.8 | 0.6 |
| Activity coefficient 1 | g PE/(g solid cat, h, bar) | 276 | 296 | 127 | 91 |
| Activity coefficient 2 | g PE/(g cat system, h, bar) | 115 | 123 | 51 | 36 |
| POLYMER ANALYSES POWDER | | | | | |
| MFR2 | g/10 min | 0.64 | 0.48 | 0.79 | 0.96 |
| MFR21 | g/10 min | 15 | 12 | 18 | 22 |
| Mw | g/mol | 140 000 | — | 153 864 | — |
| Mn | g/mol | 33 000 | — | — | — |
| Mw/Mn | — | 4.2 | — | — | — |
| Methyl groups | 1/1000 C | | 1.8 | | |
| Comon. content (FT-IR) | wt % | — | 3.2 | 2.8 | 3.1 |
| Density | kg/dm3 | 934.4 | 933 | 935 | 934.4 |
| Ash | wt ppm | 270 | 260 | 650 | 980 |

*M1B: 3-methyl-1-butene

Surprisingly, the activity coefficients were higher with 3-methyl-1-butene than with 1-butene. This is advantageous in films, as it would result in purer films with either less tendency to degradation or less consumption of costly antioxidant for the same life time of the film.

Polymers were also mixed with antioxidant, 1500 ppm Irganox B561 from Ciba (contains 20 w % Irgafos 168 (tris (2,4-di-t-butylphenyl)phosphite) and 80 wt % Irganox 1010 (pentaerythrityl-tetrakis(3-(3',5'-di-tert butyl-4-hydroxyphenyl)-propionate)) and then pelletized by a Prism 16 extruder at 200° C. extruder temperature. Powders of parallel runs were partially mixed before pelletisation as can be seen in Table 2 below.

Preparation of Polymer Films

Pellets were blown into film on a Collin monolayer film line with screw diameter 25 mm, length/diameter ratio of 25, die diameter 50 mm and with die gap adjusted to 1.5 mm. The polymers were run at a screw speed of 60 rpm, melt temperature 175° C., blow up ratio (BUR) of 3.5 and take off speed 1.9 m/min. The film thickness was adjusted to approximately 40 μm. Films for testing were selected to be 40 μm.

TABLE 2

| Pellets and film | | | | |
|---|---|---|---|---|
| | | Material | | |
| | | A | B | D |
| Polymerization runs | | 1 | 2 | 3 + 4 |
| Comonomer | | M1B | M1B | 1-butene |
| ANALYSES OF PELLETS | | | | |
| MFR$_2$ | g/10 min | 0.72 | 0.55 | 0.89 |
| η* (0.05 s$^{-1}$) | Pa s | | | 10 713 |
| η* (300 s$^{-1}$) | Pa s | | | 986 |
| M$_w$ | g/mol | 120 000 | 135 000 | 125 000 |
| M$_n$ | g/mol | 31 800 | 33 200 | 28 900 |
| M$_w$/M$_n$ | — | 3.8 | 4.1 | 4.3 |
| M$_z$ | g/mol | 365 000 | 465 000 | 425 000 |
| M$_v$ | g/mol | 100 000 | 115 000 | 100 000 |
| Density | kg/dm$^3$ | 935.5 | 934.0 | 935.7 |
| FILM TESTING | | | | |
| General | | | | |
| Film thickness | μm | 40 | 40 | 40 |
| Dart Drop | g | 70 | 70 | 70 |
| Haze | % | 29 | 30 | 30 |
| Tensile tests machine direction (MD) | | | | |
| Secant modulus | MPa | 375 | 360 | 375 |
| Tensile stress at yield | MPa | 17.2 | 17.6 | 19 |
| Tensile strain at yield | % | 9.9 | 10.9 | 12 |
| Tensile strength | MPa | 37 | 43 | 35 |
| Tensile strain | % | 715 | 705 | 765 |

TABLE 2-continued

| | | Pellets and film | | |
| --- | --- | --- | --- | --- |
| | | Material | | |
| | | A | B | D |
| at break | | | | |
| Elmendorf tear resistance | N | 1.3 | 1.1 | 0.62 |
| Tensile tests transverse direction (TD) | | | | |
| Secant modulus | MPa | 400 | 355 | 390 |
| Tensile stress at yield | MPa | 17.6 | 18.5 | 21.4 |
| Tensile strain at yield | % | 6.7 | 7.7 | 8.8 |
| Tensile strength | MPa | 35 | 36 | 33 |
| Tensile strain at break | % | 745 | 730 | 780 |
| Elmendorf tear resistance | N | 2.4 | 3.2 | 1.7 |

Surprisingly the tear resistance of the films made with a copolymer comprising 3-methyl-1-butene were much better than those made with a copolymer comprising butene. Also the tensile strength was higher for the films with 3-methyl-1-butene than those with butene. Both of these mechanical properties are vital to have at a high value for films for industrial use as well as for lamination film.

5.2.2 Example 2

Ziegler Natta co- and ter-Polymerisation

Ziegler Natta catalyst was synthesised in laboratory scale according to Example 1 of US 2006/0014897.

Polymerisation

Polymerisation was carried out in an 8 liter reactor fitted with a stirrer and a temperature control system. 0.15 bar $H_2$ had been added to the reactor. Polymerisation was done at 85°, at a total pressure of 21 bar gauge, and with 15 bar $N_2$ partial pressure in the reactor. No alkane was added. 1 M triethylaluminum (TEAL) in heptane was added as given in Table 3a and polymerised for a period as shown in Table 3a.

Table 3a shows that the runs gave essentially the same density. The activity coefficient with 3-methyl-1-butene as comonomer is about 1.7 higher than with the linear alkenes 1-butene and 1-hexene in order to reach this density. Using a mixture of 3-methyl-1-butene and 1-butene, surprisingly gives almost no loss in activity coefficient in comparison to using 3-methyl-1-butene alone to reach this density. This was achieved by adding about half the amount of 1-butene used alone, and about half of the 3-methyl-1-butene used alone. Thus, a mixture of 3-methyl-1-butene and a linear 1-alkene gives a combination of essentially the high activity achieved with 3-methyl-1-butene alone, at the same time that it needs a much lower total concentration of comonomer in the reactor than 3-methyl-1-butene alone as comonomer to reach a given density.

Pelletisation

The dried polymer powders from polymerisations were mixed with 1500 ppm Irganox B561 antioxidant from Ciba (contains 20 w % Irgafos 168 (Tris(2,4-di-t-butylphenyl) phosphate) and 80 wt % Irganox 1010 (Pentaerythrityl-tetrakis(3-(3',5'-di-tert butyl-4-hydroxyphenyl)-propionate)) and 10% wt of a Ziegler Natta bimodal PE of density 937 g/dm$^3$ and MFR2 of 0.4. The mixture was blended pelletised by a Prism 16 extruder at 210° C. extruder temperature.

TABLE 3a

Ziegler Natta co-and ter-polymerisation, pelletisation and moulded specimens tests

| Run no | | 1 | 2 | 3 | 4 | 5 | 6 | 7 | 8 | 9 | 10 | 11 |
| --- | --- | --- | --- | --- | --- | --- | --- | --- | --- | --- | --- | --- |
| POLYMERISATION | | | | | | | | | | | | |
| Catalyst feed | g | 0.84 | 0.81 | 0.88 | 0.91 | 0.91 | 0.71 | 0.95 | 0.94 | 0.93 | 0.93 | 0.93 |
| TEAL solution | ml | 11.4 | 11.0 | 11.9 | 12.3 | 12.3 | | 12.9 | 12.8 | 12.6 | 12.6 | 12.6 |
| Comonomer type [1] | | M1B | M1B | M1B | M1B/Butene | M1B/Butene | Hexene | Hexene | Hexene | Butene | Butene | Butene |
| Comonomer start | ml | 90 | 75 | 80 | 60 | 60 | 13 | 22 | 25 | 20 | 25 | 24 |
| Comonomer (continuous) 0-10 min | g/100 g ethylene | 72 | 64 | 59 | 52 | 52 | 32 | 28 | 30 | 26 | 29 | 24 |
| Comonomer (continuous) 10 min - end | g/100 g ethylene | 1.9 | 1.8 | 1.8 | 1.5 | 1.5 | 0.5 | 0.6 | 0.6 | 0.5 | 0.6 | 0.5 |
| Run time | min | 126 | 122 | 111 | 117 | 119 | 177 | 158 | 160 | 157 | 154 | 155 |
| Yield | g | 2060 | 1790 | 1900 | 1800 | 1820 | 1400 | 1700 | 1900 | 1630 | 1760 | 1800 |
| Productivity | kg PE/g cat. | 2.5 | 2.2 | 2.2 | 2.0 | 2.0 | 2.0 | 1.8 | 2.0 | 1.8 | 1.9 | 1.9 |
| Activity coefficient | g PE/(g cat., h, bar) | 234 | 217 | 233 | 203 | 202 | 134 | 136 | 152 | 134 | 147 | 150 |
| POLYMER ANALYSES POWDER | | | | | | | | | | | | |
| MFR2 | g/10 min | 0.24 | 0.22 | 0.2 | 0.21 | 0.23 | 0.14 | 0.18 | 0.15 | 0.17 | 0.18 | 0.18 |
| Mw | g/mol | 155 000 | 145 000 | n.a. | n.a. | 150 000 | 155 000 | n.a. | n.a. | n.a. | 170 000 | 170 000 |
| Mn | g/mol | 48 000 | 46 000 | n.a. | n.a. | 41 000 | 42 000 | n.a. | n.a. | n.a. | 53 000 | 52 000 |
| Mw/Mn | — | 3.2 | 3.2 | n.a. | n.a. | 3.7 | 3.7 | n.a. | n.a. | n.a. | 3.2 | 3.2 |
| Comonomer content | wt % | 2.4 | 2.2 | n.a. | n.a. | n.a. | 1.8 | n.a. | n.a. | n.a. | 2.6 | 2.6 |
| Density | kg/dm3 | 935 | 935 | 934 | 934 | 934 | 936 | 935 | 935 | 934 | 935 | 935 |
| PELLETISATION | | | | | | | | | | | | |
| Maximum feed screw rotation speed | % | 45 | 42 | 45 | 40 | 40 | 35 | 40 | 38 | 33 | 40 | 40 |

TABLE 3a-continued

Ziegler Natta co-and ter-polymerisation, pelletisation and moulded specimens tests

| Run no | | 1 | 2 | 3 | 4 | 5 | 6 | 7 | 8 | 9 | 10 | 11 |
|---|---|---|---|---|---|---|---|---|---|---|---|---|
| Maximum rate | kg/h | 2.3 | 2.3 | 2.3 | 2.0 | 2.0 | 1.7 | 1.8 | 1.5 | 1.7 | 2.0 | 2.0 |
| POLYMER ANALYSES PELLETS | | | | | | | | | | | | |
| MFR2 | g/10 min | 0.16 | 0.17 | 0.17 | 0.19 | 0.20 | 0.14 | 0.15 | 0.10 | 0.11 | 0.13 | 0.13 |
| Density | kg/dm3 | 936.2 | 936.4 | 936.6 | 936.9 | 936.9 | 939.4 | 939.5 | 938.7 | 938.5 | 937.0 | 937.9 |
| COMPRESSION MOULDED SPECIMENS TESTS | | | | | | | | | | | | |
| Secant modulus | MPa | 560 | 625 | 610 | 640 | 630 | 690 | 700 | 680 | 650 | 600 | 620 |
| Tensile stress at yield | MPa | 18.5 | 18.4 | 18.5 | 19.3 | 19.1 | 20.6 | 20.6 | 20.1 | 19.7 | 19.0 | 19.4 |
| Tensile strain at yield | % | 12.0 | 12.0 | 11.9 | 12.3 | 12.1 | 11.6 | 11.5 | 11.8 | 12.1 | 12.3 | 10.5 |
| Tensile strength | MPa | 25.7 | 26.7 | 26.8 | 29.0 | 28.8 | 27.0 | 28.1 | 25.9 | 28.3 | 29.4 | 33.4 |
| Tensile strain at break | % | 650 | 680 | 710 | 727 | 750 | 630 | 710 | 590 | 700 | 775 | 885 |
| Charpy impact strenght | kJ/m$^2$ | 89 | 87 | 87 | 77 | 76 | 72 | 74 | 90 | 80 | 82 | 77 |

[1] Mix M1B/Butene: 75 vol %/25 vol %. M1B: 3-methyl-1-butene

TABLE 3b

Ziegler-Natta polymer film blowing and film properties

| | | Polymerisation run material | | | | | | | |
|---|---|---|---|---|---|---|---|---|---|
| | | 1 | 2 | 3 | 4 | 5 | 9 | 10 | 11 |
| Comonomer type [1] | | M1B | M1B | M1B | M1B/Butene | M1B/Butene | Butene | Butene | Butene |
| FILM BLOWING [2] | | | | | | | | | |
| Bubble stability | | Stable | Stable | Stable | Stable | Stable | Pumping | Pumping | Pumping |
| Output kg/h | kg/h | 4.38 | 4.38 | 4.38 | 3.92 | 4.21 | 2.81 | 3.05 | n.a. |
| Take off speed | m/min | 3.3 | 3.3 | 3.3 | 3.1 | 3.1 | 2.6 | 2.6 | n.a. |
| FILM TESTING General | | | | | | | | | |
| Density (film material) | kg/dm$^3$ | 935.2 | 935.4 | 935.2 | 935.7 | 935.5 | 936.7 | 936.1 | 937.1 |
| Dart drop | g | 180 | 170 | 160 | 175 | 160 | 125 | 115 | 100 |
| Puncture resistance | | | | | | | | | |
| Max force | N | 69 | 76 | 75 | 69 | 74 | 64 | 61 | 51 |
| Deformation at max force | mm | 75 | 84 | 87 | 78 | 80 | 62 | 64 | 58 |
| Optical properties | | | | | | | | | |
| Gloss | % | 23 | 25 | 26 | 38 | 41 | 21 | 22 | 29 |
| Haze | % | 43 | 43 | 42 | 34 | 30 | 48 | 48 | 41 |
| Tests transverse direction (TD) | | | | | | | | | |
| Secant modulus | MPa | 465 | 490 | 495 | 485 | 445 | 510 | 515 | 525 |
| Tensile stress at yield | MPa | 20.2 | 20.9 | 21.4 | 21.5 | 21 | 21.8 | 21.5 | 22 |
| Tensile strain at yield | % | 9.6 | 9.1 | 9.9 | 9.3 | 10.5 | 8.2 | 7.2 | 7.6 |
| Tensile strength | MPa | 48.5 | 51 | 52.6 | 57.5 | 58.6 | 52 | 48 | 41 |
| Tensile strain at break | % | 720 | 715 | 735 | 755 | 790 | 745 | 725 | 730 |
| Elmendorf tear resistance | N | 6.2 | 6.1 | 6.2 | 4.5 | 4.9 | 4 | 4.7 | 3.9 |
| Tests machine direction (MD) | | | | | | | | | |
| Secant modulus | MPa | 420.0 | 445 | 420 | 415 | 410 | 435 | 425 | 425 |
| Tensile stress at yield | MPa | 18.6 | 18.8 | 18.6 | 18.8 | 18.6 | 19.1 | 18.8 | 18.5 |
| Tensile strain at yield | % | 12.0 | 11.2 | 12.3 | 11.5 | 11.7 | 10.5 | 9.8 | n.a. |
| Tensile strength | MPa | 55 | 60 | 61 | 57 | 54 | 58.7 | 58 | 58 |
| Tensile strain at break | % | 610 | 620 | 620 | 660 | 625 | 560 | 590 | 560 |
| Elmendorf tear resistance | N | 1.4 | 1.3 | 1.2 | 1.3 | 1.2 | 0.9 | 1.1 | 0.5 |

[1] M1B: 3-methyl-1-butene. Mix M1B/Butene: 75 vol %/25 vol %
[2] Less wrinkles were seen on films during extrusion of films with 3-methyl-1-butene than on the other films.

It was observed that the maximum output rate achievable before getting operational problems was highest for polymers with 3-methyl-1-butene only as comonomer and next highest for polymers with a blend of 3-methyl-1-butene and 1-butene, see Table 3a. The polymers with only linear alkenes (1-butene and 1-hexene) as comonomer were inferior.

Film Blowing and Film

Pellets were blown into film on a Collin monolayer film line with screw diameter 25 mm, length/diameter ratio of 25, die diameter 50 mm and with die gap adjusted to 1.5 mm. The polymers were run at a blow up ratio (BUR) of 3.5 and screw speed of 90 rpm. The temperature zones settings were set to (increasing towards extruder head) 200-230° C. By varying take off speed, the film thickness was adjusted to approximately 40 μm in each run. Films for testing were selected to be 40 μm. The film blowing parameters and analytical results are shown in Table 3b.

Table 3b shows that in spite of the constant screw rotational speed, the output rate, and therefore also the take off speed, varied quite much between runs. The polymers with 3-methyl-1-butene only as comonomer had the highest production rate, those with 1-butene only the lowest rates, while the polymers with blend of 3-methyl-1-butene and 1-butene had intermediate rates.

Furthermore, the polymers with 1-butene only showed unstable bubble (indicating that a slightly higher production rate would result in bubble failure), while the runs with 3-methyl-1-butene gave good stability.

It was found that that the polymers with 3-methyl-1-butene as comonomer compared with polymers with 1-butene only as comonomer gave significantly improved properties (Table 3): Better impact properties (higher dart drop), better puncture resistance (higher maximum force and deformation at maximum force), better optical properties (higher gloss, lower haze), and higher Elmendorf tear resistance in both TD and MD direction. It should be noted that for optical properties, gloss and haze, the terpolymers having both 3-methyl-1-butene and 1-butene together were surprisingly the superior.

U.S. provisional patent application 61/146,948 filed Jan. 23, 2009, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A film, comprising:
an unimodal interpolymer of ethylene, a 3-substituted $C_{4-10}$ alk-1-ene which is 3-methyl-1-butene, and a $C_{3-8}$ alkene monomer,
wherein
a density of the interpolymer is from 890 to 940 kg/m$^3$,
a content of transition metal per kg of interpolymer in the film is less than 300 μmol, and
the interpolymer is obtained by polymerization of a monomer composition comprising ethylene, the 3-substituted $C_{4-10}$ alk-1-ene and the $C_{3-8}$ alkene monomer in the presence of a catalyst system comprising a Ziegler Natta catalyst;
said catalyst is a heterogeneous catalyst in particulate form and comprises titanium as a transition metal component which is sigma-bonded to its ligands and an activator and said catalyst further comprises a particle building material;
wherein a weight % content of the 3-substituted $C_{4-10}$ alk-1-ene in the interpolymer is from 0.0 to 40 wt % based on a total weight of the interpolymer; and
wherein a weight % content of the ethylene in the interpolymer is at least 60 wt % based on the total weight of the interpolymer.

2. The film as claimed in claim 1, wherein a Mw of the unimodal interpolymer is from 20,000 to 900,000.

3. The film as claimed in claim 1, wherein a MFR$_2$ of the unimodal interpolymer is from 0.01 to 5000.

4. The film as claimed in claim 1, further comprising polyethylene.

5. The film as claimed in claim 1, further comprising an antioxidant.

6. The film as claimed in claim 1 which is a blown film or multilayer film or an industrial film.

7. A process for the preparation of a blown film, comprising:
blowing the unimodal interpolymer of claim 1.

8. A laminate or an article or a packaging, comprising a film as claimed in claim 1.

9. The film as claimed in claim 1, wherein the Ziegler Natta catalyst comprises a chromium oxide catalyst.

\* \* \* \* \*